United States Patent
Cano

(10) Patent No.: US 11,502,377 B2
(45) Date of Patent: Nov. 15, 2022

(54) BUSBAR CONNECTOR

(71) Applicant: JAGUAR LAND ROVER LIMITED, Coventry (GB)

(72) Inventor: Gerardo Cano, Warwickshire (GB)

(*) Notice: Subject to any disclaimer, the term of this patent is extended or adjusted under 35 U.S.C. 154(b) by 332 days.

(21) Appl. No.: 16/476,807

(22) PCT Filed: Jan. 29, 2018

(86) PCT No.: PCT/EP2018/052091
§ 371 (c)(1),
(2) Date: Jul. 9, 2019

(87) PCT Pub. No.: WO2018/158019
PCT Pub. Date: Sep. 7, 2018

(65) Prior Publication Data
US 2019/0379025 A1  Dec. 12, 2019

(30) Foreign Application Priority Data
Feb. 28, 2017  (GB) .................................. 1703251

(51) Int. Cl.
*H01M 50/20* (2021.01)
*H01M 50/502* (2021.01)

(52) U.S. Cl.
CPC ......... *H01M 50/502* (2021.01); *H01M 50/20* (2021.01); *H01M 2220/20* (2013.01)

(58) Field of Classification Search
CPC ............................ H01M 50/502; H01M 50/20
See application file for complete search history.

(56) References Cited

U.S. PATENT DOCUMENTS

2010/0000089 A1* 1/2010 Yang ................... H01G 9/08
29/854
2013/0230761 A1* 9/2013 Okutani ............ H01M 50/502
429/158

FOREIGN PATENT DOCUMENTS

| CN | 202695601 U | 1/2013 |
| DE | 102013017168 A1 | 4/2015 |
| WO | 2010141853 A1 | 12/2010 |

OTHER PUBLICATIONS

International Search Report and Written Opinion, PCT/EP2018/052091, dated May 14, 2018.
Search and Examination Report, GB1703251.7, dated Sep. 14, 2017.

* cited by examiner

*Primary Examiner* — Olatunji A Godo
(74) *Attorney, Agent, or Firm* — McCoy Russell LLP

(57) ABSTRACT

A busbar connector (60) for making one or more electrical connections within or to a battery module (M) of a battery pack, the battery module (M) comprising one or more battery cells, wherein the busbar connector (60) comprises: a base portion (160) for forming an electrical connection to one or more of the battery cells within the module; and at least one connector portion (180, 190) for forming an electrical connection from the base portion (160) to one or more other components of the module or the battery pack; wherein at least one or more of the following (i) to (iv) is satisfied: (i) the at least one connector portion (180, 190) has a non-uniform transverse cross-sectional area passing therealong, or (ii) the at least one connector portion (180, 190) has a lateral width which varies passing therealong, or (iii) the base portion (160) has a longitudinal length, the base portion (160) and the at least one connector portion (180, 190) are united or joined via an attachment portion, and the (Continued)

attachment portion has a length dimension, in the same direction as the longitudinal length of the base portion (160), which is greater than the lateral width of the at least one connector portion (180, 190) at locations therealong spaced or distal from the attachment portion, or (iv) the base portion (160) has a longitudinal length, and the at least one connector portion (180, 190) extends transversely from a lateral side of the base portion (160), and further extends in a general length direction (L) thereof which lies at an angle relative to the longitudinal length direction of the base portion (160), wherein the said angle lies in the range of from greater than 0 or 2 or 5 or 10 or 15 or 20 or 25° up to 30 or 40 or 50 or 60 or 70 or 80 or 90° relative to the longitudinal length direction of the base portion (160).

20 Claims, 9 Drawing Sheets

BUSBAR CONNECTOR

CROSS-REFERENCE TO RELATED APPLICATIONS

This application is a 371 of International Application No. PCT/EP2018/052091, filed Jan. 29, 2018, which claims priority to GB Patent Application 1703251.7, filed Feb. 28, 2017, the contents of both of which are incorporated by reference herein in their entirety.

TECHNICAL FIELD

This invention relates to a busbar connector. More particularly though not exclusively it relates to a busbar connector for a battery module or battery, such as that for a motor vehicle, especially an electric vehicle. More particularly though not exclusively the invention relates to a busbar connector for use in assisting control or optimisation of current density and/or current distribution therein, and thus thermal operating characteristics of a battery module or battery containing same. The invention further relates to a manner of manufacture of such a busbar connector, and to a battery module or battery containing one or more of the busbar connectors.

BACKGROUND OF THE INVENTION AND PRIOR ART

Many modern motor vehicles, in particular those powered by an electric motor, employ a battery to provide electrical power to the vehicle's motor and various on-board electrical systems. Typical batteries, especially those commonly used in electric vehicle traction applications, comprise a series or array of battery modules, each module comprising an array of a plurality of interconnected electrochemical battery cells connected together to provide the required module voltage and capacity. The modules are then connected together within the overall battery pack to provide the overall pack voltage and energy required.

Electrical vehicle traction battery applications generally utilise lithium ion cells, which are commercially available in a variety of configurations, e.g. cylindrical. In order to provide mechanical support, individual cells are usually packaged within housings, frames or cassettes, typically of plastics material, and each housing, frame or cassette may also include provision for cooling the cell, such as a heatsink device. The individual cells within an assembled module are then electrically interconnected using busbars, which are also used to interconnect the modules to form the complete battery.

In practice battery modules utilising cylindrical lithium ion cells generally require a means for managing the heat produced by individual cells by either removing excess heat from individual cells or to provide heat thereto, depending on the demands of the vehicle drive cycle being followed. The general aim is to achieve a consistent range of temperature, and as far as possible a uniform distribution of temperature, across the array of cells making up the or each module within predefined limits. This thermal control or optimisation is primarily for the purpose of ensuring cell reliability and longevity.

The design of the busbars which interconnect individual cells and respective modules can play an important role in this, since the uniformity and/or distribution of current density within the busbars can have a marked effect on their resulting thermal transfer or distribution characteristics. Indeed, hitherto most attention has been paid to the design of heat exchanger devices and cell housings, frames or cassettes in an effort to improve and optimise thermal transfer characteristics to suit individual practical requirements.

However, up to now little or no attention has been given to the design of the busbar connectors themselves via which individual cells and respective modules are interconnected. In particular, little or no attention has been given to how current density and current distribution within busbar connectors may be controlled, influenced or optimised with a view to contributing to the overall manner in which heat is transferred or distributed between cells or within an overall battery module or battery pack or assembly. Indeed, requirements for efficient heat transfer and distribution in often precisely defined locations within an overall module assembly lead to complex assemblies with large numbers of component parts, in order to achieve optimum thermal management of and across all cells in a given module. Achieving optimum such thermal management is difficult to achieve reliably and consistently.

Thus, there is a need in the art for an improved form of thermal management arrangement for use in battery modules, and in particular for improving the thermal transfer and distribution characteristics of busbar and other connectors themselves.

It is thus a primary object of the present invention to address this need and to provide a busbar connector, especially for use in battery modules, which ameliorates the problems, shortcomings or limitations of known battery module busbar connectors of the prior art, particularly those already in use in known vehicle battery modules.

Other objects and advantages of the invention or embodiments thereof may be apparent from the further definitions and descriptions which follow below of embodiments of the invention and particular features thereof.

SUMMARY OF THE INVENTION

Embodiments of the invention in its various aspects may be understood with reference to the appended claims.

In various of its aspects, the present invention provides a heat exchanger device, a method of making the heat exchanger device, a battery module comprising or fitted with one or more of the heat exchanger devices, a battery comprising one or more battery modules together with one or more of the heat exchanger devices, and a vehicle comprising the battery or at least one battery module together with at least one of the heat exchanger devices.

In various other aspects of the present invention there are provided a battery cell housing, a method of making the battery cell housing, a battery module comprising one or more cells housed within the housing, a battery comprising one or more battery modules each comprising one or more cells housed within a respective housing, and a vehicle comprising the battery or at least one battery module each comprising one or more cells housed within a respective housing.

In yet further aspects of the present invention there are provided a busbar connector, a method of making the busbar connector, a battery module comprising one or more of the busbar connectors, a battery comprising one or more battery modules each comprising one or more of the busbar connectors, and a vehicle comprising the battery or at least one battery module each comprising one or more of the busbar connectors.

In one aspect of the present invention for which protection is sought there is provided a heat exchanger device for use in or with a battery module, comprising:

a body of thermally conductive material including one or more conduits or channels therewithin for permitting flow therethrough of a thermal transfer medium, wherein at least one surface of the body is provided with an electrically insulating coating.

In another aspect of the present invention for which protection is sought there is provided a battery module comprising or fitted with at least one heat exchanger device, the or each heat exchanger device comprising:

a body of thermally conductive material including one or more conduits or channels therewithin for permitting flow therethrough of a thermal transfer medium, wherein at least one surface of the body is provided with an electrically insulating coating.

In embodiments of the preceding aspect the battery module may comprise one or more electrochemical cells, wherein the or each cell is in thermal contact with a or a respective said heat exchanger device.

In yet another aspect of the present invention for which protection is sought there is provided a battery comprising one or more battery modules, wherein the or each battery module, or at least one of the battery modules, comprises or is fitted with at least one heat exchanger device, the or each heat exchanger device comprising:

a body of thermally conductive material including one or more conduits or channels therewithin for permitting flow therethrough of a thermal transfer medium, wherein at least one surface of the body is provided with an electrically insulating coating.

In embodiments of the preceding aspect the battery may be in the form of a battery pack or battery assembly comprising one or more battery modules each comprising one or more electrochemical cells, wherein the or each battery module, or the or each cell therein, is in thermal contact with a or a respective said heat exchanger device.

In a yet further aspect of the present invention for which protection is sought there is provided a vehicle including a battery comprising one or more battery modules, wherein the or each battery module, or at least one of the battery modules, comprises or is fitted with at least one heat exchanger device in thermal contact therewith, the or each heat exchanger device comprising:

a body of thermally conductive material including one or more conduits or channels therewithin for permitting flow therethrough of a thermal transfer medium, wherein at least one surface of the body is provided with an electrically insulating coating.

In any of the hereinabove or hereinbelow aspects the battery module, or the battery, may be that of or for use in any type of vehicle for locomotion by land, sea or air, such as cars, vans, goods or freight vehicles, motorcycles, road vehicles for public transportation such as buses, trains, trams, cable-carried vehicles, water-borne vehicles or craft, aircraft, or even spacecraft. Such vehicles may especially be selected from electrically powered or electrically driven vehicles, including all-electric and/or hybrid vehicles.

In any of the battery module, battery or vehicle defined in the preceding or following paragraphs as heat exchanger devices according to aspects of this invention, one or more of the subject heat exchanger devices may be employed independently of the use or inclusion of any cell housing(s) and/or, independently, any busbar connector(s) also disclosed elsewhere in this specification. Furthermore, one or more of the subject heat exchanger devices may be employed independently of the optional use or inclusion of any known cell housing and/or, independently, any known busbar connector already available or known from the prior art.

It is a particular advantage of many embodiments of the present invention that by arranging for the heat exchanger device to be both thermally conductive and, on at least one surface thereof, electrically insulating, this may allow the heat exchanger device to be positionable in direct surface contact with electrically conductive components in the battery module or overall battery assembly, such as individual cells, busbars or conductors that electrically connect cells or modules together, substantially without risk of, or with reduced risk of, short circuits being caused.

Accordingly, an embodiment heat exchanger device within the scope of the invention may form a component of an individual battery module assembly or may be contained within an overall battery or battery pack or assembly. In particular, for example, an embodiment heat exchanger device within the scope of the invention may be contained within a housing, frame or cassette of a battery module or an overall battery or battery pack or assembly, or may even itself form a major or substantial portion of a housing, frame or cassette for a battery module or an overall battery or battery pack or assembly.

A yet further advantage to be had from practising embodiments of the present invention may be that a thermally conductive yet electrically insulating heat exchanger device according to embodiments of the invention may facilitate the design and use of novel and spatially more efficient battery module and battery component configurations by removing typical restrictive design constraints that are commonly encountered with known battery heat exchanger devices or arrangements.

In another aspect of the present invention for which protection is sought there is provided a method of manufacturing a heat exchanger device for use in or with a battery module, the method comprising:

(i) forming or providing a body of thermally conductive material including one or more conduits or channels therewithin for permitting flow therethrough of a thermal transfer medium, and (ii) applying or fabricating onto at least one surface of the body an electrically insulating coating.

In practical embodiments of the above method the step (i) may comprise the steps of:

(ia) providing a body of thermally conductive material, and (ib) forming within said body one or more conduits or channels for permitting flow therethrough of a thermal transfer medium.

In many embodiments of the above methods, step (ii) may be carried out subsequent to step (i) or steps (ia) and (ib), whereby the electrically insulating coating may be formed or applied on the body surface only after the thermal medium transfer conduits or channels have been formed therewithin. This is so that the coating maintains its structure, integrity and bonding to the underlying body surface once formed, which properties might be compromised if the forming of the internal conduits or channels were to be carried out subsequent to the coating being formed or applied, for example in the case of using an internal expansion technique, as discussed further below.

However, it may be that in other embodiments, where a different process is used to form the thermal medium transfer conduits or channels within the device body, the step (ii) may be carried out prior to step (i) or steps (ia) and (ib). For instance, in an alternative technique for forming the thermal medium transfer conduits or channels within the device body, two layers forming the body may each individually be pre-formed by stamping or moulding so as to pre-incorporate respective halves of the relevant pattern of internal conduits or channels to be formed. At that stage the requisite electrical insulating coating may then be applied to the relevant surface(s), region(s) or portion(s) of one or both of the pre-shaped layers. Then, when the two pre-shaped and pre-coated layers are brought together and bonded, e.g. by a suitable adhesive or welding or other bonding technique, the complete pattern of internal conduits or channels results, with the electrically insulating coating already having been applied beforehand on the relevant surface(s) of the body or region(s) or portion(s) thereof.

In some embodiments of the heat exchanger device of the invention the basic structure of the device, being the body of thermally conductive material including the one or more conduits or channels therewithin for permitting flow therethrough of the thermal transfer medium, may be fabricated using any suitable method or technique.

In some embodiments the thermally conductive material may comprise aluminium or an aluminium alloy. However, other suitable thermally conductive metals or metal alloys may be employed instead, if appropriate or desired, such as one or more metals or metal alloys selected from or containing any of the following: zinc, iron, a carbon steel, magnesium, titanium, niobium, zirconium, hafnium, tantalum, an alloy of any of the foregoing metals, or an alloy containing aluminium and any of lithium, beryllium or magnesium.

Although embodiments of the invention may focus on the thermally conductive material of the body often being of substantially electrically conductive material, in certain alternative embodiments still within the scope of the invention it may be possible for the thermally conductive material to be electrically insulating or may have a moderate to high electrical resistivity.

In some embodiments of the heat exchanger device of the invention the basic structure, being the body of thermally conductive material including one or more conduits or channels therewithin for permitting flow therethrough of a thermal transfer medium, may be fabricated by a method comprising the steps of:
 (ia) forming a body of thermally conductive material comprising at least two layers, wherein one or more regions or portions of the layers are selectively bonded together in one or more predefined locations which define therebetween the one or more conduits or channels to be formed therein, and
 (ib) expanding spaces inbetween the said material layers between the said bonded locations so as to form the said one or more conduits or channels within the body for permitting flow therethrough of the thermal transfer medium.

Practical examples of a fabrication process comprising the above method steps (ia) and (ib) may be found in existing industrial technology in the art of making heat exchangers for use in refrigerators, for instance. By way of example, an overall process for the selective or patterned bonding together of the pair of aluminium sheets, followed by expansion of non-bonded spaces inbetween the sheets to form the said one or more conduits or channels, may be carried out using a modified roll-bonding or cold-welding technique and apparatus, wherein, in general terms:
 1 (1) a pattern corresponding to the desired shape and configuration of conduits or channels to be formed is applied to a surface of at least one of the aluminium sheets, e.g. by a serigraphy or other printing technique, in the form of a resist or anti-bonding material applied only in selected regions or portions of the sheet surface corresponding to the pattern;
 (2) the combined face-to-face sheets may then be pre-heated, e.g. typically at a temperature of up to around 400° C.;
 (3) rolling of the combined sheets is then carried out in a press, e.g. under typical pressures of up to around 600 tonnes;
 (4) annealing (for hardening purposes) may then be carried out, e.g. by heat treatment at a temperature of up to around 450° C.;
 (5) the roll-bonded sheets may then be cooled (e.g. using water) and dried;
 (6) the separation and expansion of the non-bonded regions or portions of the bonded sheets corresponding to the initially applied pattern is then accomplished by pumping into the exposed opening(s) thereof an expansion fluid, e.g. a gas such as compressed air, at a suitable elevated pressure, e.g. in the range of from about 90 to about 130 bar.

Of course, the above defined steps (1)-(6) are just one generally defined overall example, and other sequences, numbers or identities of individual steps or stages, as well as individual parameters of any such steps, may be employed in addition to or instead of any of those exemplified above to achieve the same overall result. Practical examples of techniques and process steps for forming such basic structures of heat exchanger devices for further processing into embodiments of the invention will be readily apparent to, and within the general skill and knowledge of, persons skilled in the art.

Any suitable arrangement or pattern of the conduits or channels to carry the thermal transfer medium may be used, e.g. depending on particular heat transfer properties, routes or distributions required, and/or particular practical shapes and configurations of components of a battery module or battery pack or assembly into which a given embodiment heat exchanger device of the invention is to be incorporated.

Likewise the one or more conduits or channels may be of any suitable cross-sectional size and shape.

In use of embodiment heat exchanger devices of the invention the thermal transfer medium which flows through the one or more conduits or channels therewithin may be any suitable heat transfer medium, especially a heat transfer fluid, e.g. a liquid or gas. Specific examples of such heat transfer fluids are well known in the art of existing heat exchangers, but may include air, a liquid (e.g. an aqueous or a non-aqueous liquid), a phase change material or any other suitable heat transfer fluid, e.g. known coolants. The heat transfer fluid or other medium may be caused to flow through the one or more conduits or channels at any desired flow rate, optionally under a suitably elevated pressure, such as by use of a suitable pumping apparatus.

In use, embodiment heat exchanger devices of the invention may in many cases be used to cool down a battery module, battery pack or assembly, or any one or more specific components thereof, by extracting excess heat generated within one or more cells. Alternatively, in other cases embodiment heat exchanger devices of the invention may be used to provide an amount of heat to be inputted to one or more of the cells. Which of these cooling or heating scenarios may be desirable, appropriate or optimum in any given system or instance or period of operation may depend on the thermal operating parameters of the system and the drive cycle being performed by the battery or module or the vehicle containing same.

In some embodiments of the method of manufacturing a heat exchanger device, the step (ii) of applying or fabricating onto at least one surface of the formed body an electrically insulating coating may be carried out by various methods to form an electrically insulating coating comprising various suitable materials.

In some such embodiments the electrically insulating coating may be of a material, and/or may be fabricated or applied, in accordance with any of the following paragraphs, wherein the above-defined "at least one surface of the body of thermally conductive material" that is to be provided with the electrically insulating coating is to be considered as being alternatively termed a "substrate", which substrate in these embodiments comprises a metallic material.

In some embodiments a method of fabricating the said coating may comprise: providing a substrate comprising a metallic material, at least a portion of a surface of the metallic material having an exposed porous metal oxide layer; and providing a layer of a first medium over at least a portion of the exposed porous metal oxide layer, whereby the exposed porous metal oxide layer is at least partially impregnated with the first medium; and curing the layer of first medium to form an electrically insulating coating layer.

Embodiments of the above method may have the advantage that they enable a substantially continuous, electrically insulating coating to be fabricated having reduced thickness compared with some known coatings, allowing a coating with reduced thermal resistance to be provided. In some embodiments this is believed to be at least in part because the electrically insulating coating layer at least partially impregnates the surface oxide layer, enabling the coating to remain substantially continuous at a lower thickness than in known coating methods. The layer of first medium is able to impregnate the oxide layer to establish a stronger bond thereto upon curing. Consequently, following curing, the electrically insulating coating layer is more strongly bound to the substrate. Some embodiments are ideally suited to applications in which thin, highly insulating coatings having low thermal resistance are required, such as in the fabrication of heat exchanger devices for battery modules and/or batteries in accordance with embodiments of this invention.

Optionally, the step of providing a substrate comprising a metallic material having an exposed porous metal oxide layer may comprise forming a layer of porous metal oxide before providing the layer of first medium.

Forming the layer of porous metal oxide over the surface of the metallic material may comprise forming the layer of oxide being a layer than is in addition to any native oxide layer already present. The layer of oxide being formed may result in an increase in the thickness of an existing oxide layer.

The porous metal oxide layer may be a substantially continuous layer. The porous metal oxide layer may cover substantially the entire surface of the metallic material, or only a portion of the surface.

Optionally, forming a layer of oxide may comprise forming a layer of native oxide. By native oxide is meant an oxide formed by oxidation of a surface of the substrate. The formation of a native oxide may advantageously provide a layer having a strong bond with the substrate.

Optionally, forming a layer of oxide may comprise subjecting the substrate to an anodic process. The anodic process may be a hard anodic process or a soft anodic process. A hard anodic process may be preferable to a soft anodic oxide in some embodiments. Anodic processes may be particularly advantageous for industrial mass-production processes.

It is to be understood that certain metals such as aluminium and magnesium may be naturally coated with a native oxide layer when the unoxidised metal is exposed to air. Accordingly, an anodic process may increase a thickness of an existing oxide layer on the metal surface.

For example, in the case of aluminium, a relatively hard anodic oxide may be formed by anodising in sulphuric acid at relatively low temperatures or by anodising in a sulphuric acid/oxalic acid mixture at room temperature.

Soft anodic films may be produced by anodising in sulphuric acid at room temperature. Other acids may also be useful, such as chromic acid and phosphoric acid.

In some embodiments, a portion of the surface of the metallic material may be masked prior to forming the layer of oxide by an anodic process such that oxide formation by the anodic process is substantially prevented in the masked areas.

Other processes may be useful in addition or instead, including exposure of the metallic material to an oxidizing agent, such as an acid.

Optionally, providing a layer of a first medium may comprise providing a layer of a sol-gel or colloidal material over the substrate, whereby in some embodiments the layer of electrically insulating material is formed on the substrate from a layer of a sol-gel or colloidal material.

Optionally, the layer of first medium may comprise a solvent, the method comprising removing at least some solvent from the layer of first medium. The method may comprise removing at least some solvent to form a layer of a gel material.

The method may comprise subjecting the gel material to a drying operation to remove at least some of the solvent. Optionally, the drying operation may comprise densifying the layer of gel by removal of at least some solvent. This feature may advantageously result in the formation of a stronger, more scratch-resistant layer.

Optionally, the step of curing the layer of first medium may comprise heating the gel to form the electrically insulating coating layer.

In practising some embodiment methods, it is to be understood that a drying step, as referred to above, may be a separate step from, or an additional step to, the step of curing the layer of first medium, in particular where plural layers of sol-gel or colloidal material are to be formed before curing takes place.

Optionally, the substrate may comprise or consist essentially of one selected from amongst aluminium, an aluminium alloy, magnesium, a magnesium alloy, an aluminium magnesium alloy, an aluminium lithium alloy and an aluminium beryllium alloy.

Aluminium, magnesium, and alloys thereof may have the advantage that they are thermally conductive materials of relatively low weight and relatively low cost compared with some other metals. They also allow the formation of a native oxide that is strongly bondable to the underlying metallic material. A porous native oxide may be formed by anodic oxidation of the metallic material.

Other metallic substrate materials may alternatively be useful in some other embodiments.

Optionally, providing the layer of first medium may comprise forming an electrically insulating coating layer having a thickness of no more than about 100 micrometres. Thus, the cured layer may have a thickness of no more than about 100 micrometres.

Optionally, providing the layer of first medium may comprise forming an electrically insulating coating layer having a thickness in the range from about 1 micrometre to about 500 micrometres, optionally in the range from about 1 micrometre to about 100 micrometres.

Optionally, providing a substrate having an exposed porous metal oxide layer may comprise providing an exposed porous metal oxide layer having a thickness of no more than about 500 micrometres.

Optionally, providing a substrate having an exposed porous metal oxide layer may comprise providing an exposed porous metal oxide layer having a thickness in the range from about 1 micrometre to about 500 micrometres, optionally in the range from about 1 micrometre to about 100 micrometres.

Optionally, the electrically insulating coating layer may comprise a polysiloxane. The polysiloxane material may in some embodiments be formed using the two-part PSX700A clear engineered siloxane coating manufactured by PPG Industries.

Optionally, the gel material may comprise a polysiloxane, such as that exemplified in the preceding paragraph. The gel material may be in the form of particles, and the particles may be in the form of micelles of polysiloxane. Other particle types or arrangements may be useful in some other embodiments.

Optionally, the electrically insulating coating layer may be formed from a layer of a sol-gel material. Use of a sol-gel material may have an advantage that a layer of electrically insulating material of higher thermal conductivity (or lower thermal resistance) than known heat sinks or heat exchangers may be formed on the substrate. In some embodiments this may be at least in part because a substantially continuous layer of insulating material offering sufficiently high electrical isolation may be formed having a thickness that is lower than that of an insulating material formed by known techniques offering similarly high electrical isolation. Some embodiments may have an additional advantage that, at least in part because the thickness may be made lower, a weight of the coating may be made lower than known coatings.

In some embodiments the forming of the layer of sol-gel material may be accomplished by dip-coating, spin-coating, spraying or any other suitable technique.

The sol-gel material may comprise predominantly particles having a size in the range of up to around 100 nm. Such particles may be referred to as nanoparticles. The particles may be in the form of micelles. The particles may be predominantly in the size range from about 5 to about 100 nm, optionally predominantly in the range from about 10 nm to about 100 nm. Other size ranges may also be useful. The colloidal material may comprise agglomerates of particles predominantly in this size range, at least some of the agglomerates being larger than about 100 nm in some examples.

In the application of any of the above-defined embodiments of the method of fabricating the said coating to the aspect of the present invention being a method of manufacturing the heat exchanger device, there may additionally be provided within the scope of that aspect a method of forming a coated substrate comprising performing the above-defined method of fabricating the said coating.

In the application of any of the above-defined embodiments of the method of fabricating the said coating to the aspect of the present invention being a heat exchanger device per se, there may additionally be provided within the scope of that aspect a coated substrate comprising: a substrate comprising a metallic material, at least a portion of a surface of the metallic material having a porous metal oxide layer over at least a portion thereof; and an electrically insulating coating layer over at least a portion of the porous metal oxide layer, the porous metal oxide layer being at least partially impregnated with the coating layer, the electrically insulating coating layer being formed by curing a layer of a first medium.

In the application of any of the above-defined embodiments of the method of fabricating the said coating to each of the aspects of the present invention being a battery module or a battery or a vehicle including same, there may additionally be provided within the scope of each of those respective aspects a battery module or a battery or a vehicle including same comprising a heat exchanger device comprising a coated substrate according to the preceding aspect.

In the application of any of the above-defined embodiments of the method of fabricating the said coating to the various aspects of the present invention, a layer of the electrically insulating material may be formed which has improved bonding to the substrate.

In the application of any of the above-defined embodiments of the method of fabricating the said coating to the various aspects of the present invention, embodiments of the present invention may have an advantage that they enable a heat exchanger device for a battery module or battery to be manufactured which has improved thermal conductivity, as compared with known battery module heat sinks which are not provided with the subject coating of electrically insulating material. For at least some embodiments this is believed to be at least in part because the layer of electrically insulating material may be formed to be substantially continuous at a lower thickness than in known coating-forming methods.

In the practising of some of the above-defined embodiments of the method of fabricating the said coating, advantageously a step of providing the substrate—being a step of "forming or providing a body of thermally conductive material" in the above-defined method of manufacturing the heat exchanger device of the invention—may comprise forming a layer of oxide over a surface of the substrate before forming the layer of electrically insulating material thereon. This may have an advantage of improving bonding of the layer of electrically insulating material to the substrate and enable a thinner layer of insulating material to be formed more reliably.

In some embodiments the layer of oxide may comprise a plurality of pores. That is to say, the oxide layer may be porous or foraminate. This feature may have an advantage that the electrically insulating material is able to penetrate and key into the oxide layer to establish a stronger bond thereto. Thus, particles of the sol-gel material may migrate into the pores in some embodiments. Furthermore, in some embodiments the presence of the insulating material in the pores may prevent ingress of moisture into the pores. It is considered that moisture ingress into the pores of a native oxide film may result in an increase in electrical conductivity of the oxide layer, which may be deleterious to the electrical performance of the resulting heat exchanger device. Some embodiments may thus have a feature that because the pores may be occupied by the electrically insulating material, a rate of ingress of moisture may be reduced and in some embodiments ingress thereof may be substantially prevented.

In some embodiments, the presence of pores facilitating bonding of the insulating layer to the substrate may have an advantage that surface imperfections such as burrs, scratches and the like are less problematic to the integrity of the insulating layer. This is because the sol-gel material may be able to better conform to a topography of the substrate surface, when it is applied, contacting the substrate surface over substantially the whole exposed surface area of the substrate, even where surface imperfections are present. This may reduce a likelihood that the resulting insulating layer formed by the colloidal material loses its integrity resulting in the formation of one or more holes or voids in the layer.

In such embodiments the enhanced bonding between the porous oxide film and the insulating layer or coating formed by the colloidal material may also help to prevent shrinkage of the insulating coating away from topographical surface imperfections such as sharp corners present at burrs or scratches. Such shrinkage is common in known coating technologies and can result in extremely thin coatings in these areas that do not provide adequate electrical insulation.

It is to be understood that in practising various embodiment processes of manufacturing a heat exchanger device within the scope of the present invention, the employment of a coating-forming process using anodic oxidation, examples of which are discussed above, may be particularly useful, since formation of an anodic oxide over a relatively complex shape of substrate may be accomplished relatively easily. Such a process may therefore lend itself particularly well to the forming of an electrically insulating coating on the surface of the basic structure of the heat exchanger device body, where the one or more conduits or channels therewith have already been formed before the coating-forming stage of the overall process. Coating of the surface of the basic structure of the heat exchanger device body by means of a wet chemical technique also allows coating of relatively complex shapes in a relatively straightforward manner, such as by spraying or dipping. However, other coating methods may be used, such as roller coating, squeegee coating, doctor blading, transfer printing, electrophoretic methods or any other suitable method.

In embodiments of the heat exchanger device of the present invention, or embodiments of their method of manufacture, the overall shape and configuration of the heat exchanger device may be designed to suit any particular practical application or use, or any particular battery module or battery pack or assembly, or even vehicle containing same, in which the heat exchanger device is to be incorporated.

In some embodiments the heat exchanger device may be in the form of a generally flat plate, panel or sheet. In some forms it may be elongate (i.e. long in comparison with its width), especially in cases where a single given heat exchanger device is designed to span or extend over or between plural (e.g. 2, 3, 4, 5 or 6, or even more than 6) battery modules forming a complete battery pack or assembly. However, other plan shapes, or even alternative three-dimensional shapes other than generally flat, may be possible if design or space-using criteria so demand it.

Moreover, in many embodiments of the heat exchanger device of the present invention, or embodiments of their method of manufacture, the said at least one surface of the body on which the electrically insulating coating is provided may be selected from any one or more faces or surface regions or portions of the body. The said one or more faces or surface regions or portions of the body having the said electrically insulating coating provided therein may be a substantially flat or planar face or surface or surface region or portion, and/or it may be a substantially non-flat or non-planar face or surface or surface region or portion thereof, e.g. a contoured face or surface or surface region or portion of the body such as that formed by protruding or recessed regions of the one or more conduits or channel formed within the body for carrying the thermal transfer medium.

In particular, in the case of a heat exchanger device being in the form of a generally flat plate, panel or sheet, it may be that the electrically insulating coating is provided on just one major face thereof only, such as a substantially flat or planar major face thereof, which is that face which in use will thermally contact or abut or lie immediately adjacent a cell housing or busbar connector for the purpose of extracting or delivering heat from or to the cells of the module(s) or battery pack. In other words, the electrically insulating coating may be provided only on those face(s) or surface region(s) or portion(s) of the heat exchanger device body where it is actually needed, which in many practical examples will be only that/those face(s), surface region(s), portion(s) whose contact or abutment with or proximity to electrically conductive parts or components (such as cell terminals or busbar connectors themselves) renders the risk of short-circuiting an undesirable problem.

For the purpose of mounting, fitting or incorporating one or more embodiment heat exchanger devices of the invention into a battery module or battery pack or assembly, any desired configuration or arrangement thereof with respect to one or more individual battery cells and/or cell housings/frames/cassettes and/or one or more busbar connectors or other electrically conductive connectors or components that connect individual cells or modules to one another may be employed, for example depending on spatial requirements and other design criteria.

If desired or necessary, a layer, film, body or patch of a suitable thermally conductive paste or gel may be provided between any given heat exchanger device, or a portion thereof, and any one or more battery cells and/or cell housings/frames/cassettes and/or one or more busbar connectors or other electrically conductive connectors or components, in order to improve the thermal conductivity characteristics of the combined arrangement and the withdrawal of heat from, or delivery of heat to, the relevant component(s) to which the heat exchanger device is fitted or in abutment or adjacent.

In embodiment battery modules within the scope of the invention, where the battery module may typically comprise a plurality of cells, the cells may be arranged in an array or stack, e.g. a vertical stack or, more usually, a horizontal stack, or other suitable spatial arrangement. The cells may optionally be provided, either individually or collectively or a combination of both, in a suitable frame, housing or cassette, especially of a thermally conductive material. Where plural cells are provided within a given battery module, any appropriate number of cells may be provided to provide a required electrical output, which may be achieved by either a series or parallel connection arrangement of the individual cells, depending in the overall battery requirements.

In some particularly useful practical embodiments of battery module, each battery cell may be in the form of a cylindrical cell, wherein the inner components of the cell are mounted within a generally cylindrical walled casing.

In order to form a battery module generally an array of a plurality of individual battery cells are employed, being connected together in the finished module often in a parallel electrical arrangement (although a series arrangement is also possible instead). In the case of cylindrical cells, the array may generally be accommodated within a specially designed cell housing or frame, which may be designed to optimise the thermal transfer characteristics of the overall array or arrangement, in particular thermal transfer characteristics (i) between individual cells, and/or (ii) between one or more groups of cells, and/or (iii) between cells or cell-groups and one or more heat exchanger devices (whether or not a heat exchanger device according to earlier discussed aspects of the invention), and/or (iv) between cells or cell-groups and one or more busbars or other electrical connectors, and/or any combination of the aforesaid combinations.

Accordingly, in various other aspects of the present invention there are provided a battery cell housing, a method of making the battery cell housing, a battery module comprising one or more cells housed within the housing, a battery comprising one or more battery modules each comprising one or more cells housed within a respective housing, and a vehicle comprising the battery or at least one battery module each comprising one or more cells housed within a respective housing.

Accordingly, in another aspect of the present invention for which protection is sought there is provided a battery cell housing for accommodating one or more battery cells for forming a battery module, wherein the housing comprises:
 a body comprising one or more compartments each for accommodating a respective cell,
 wherein the body is formed of a thermally conductive, electrically insulating material.

In another aspect of the present invention for which protection is sought there is provided a battery module comprising one or more cells housed within a housing comprising:
 a body comprising one or more compartments each for accommodating a respective cell,
 wherein the body is formed of a thermally conductive, electrically insulating material.

In yet another aspect of the present invention for which protection is sought there is provided a battery comprising one or more battery modules each comprising one or more cells housed within a respective housing, the or each housing comprising:
 a body comprising one or more compartments each for accommodating a respective cell,
 wherein the body is formed of a thermally conductive, electrically insulating material.

In yet another aspect of the present invention for which protection is sought there is provided a vehicle including a battery comprising one or more battery modules, wherein the or each battery module, or at least one of the battery modules, comprises one or more cells housed within a respective housing, the or each housing comprising:
 a body comprising one or more compartments each for accommodating a respective cell,
 wherein the body is formed of a thermally conductive, electrically insulating material.

In any of the battery module, battery or vehicle defined in the preceding or following paragraphs as cell housings according to aspects of this invention, one or more of the subject cell housings may be employed independently of the use or inclusion of any heat exchanger device(s) and/or, independently, any busbar connector(s) also disclosed elsewhere in this specification. Furthermore, one or more of the subject cell housings may be employed independently of the optional use or inclusion of any known heat exchanger device and/or, independently, any known busbar connector already available or known from the prior art.

In yet another aspect of the present invention for which protection is sought there is provided a method of making a battery cell housing, comprising:
 forming a body comprising one or more compartments each for accommodating a respective cell, wherein the material used to form the body is of a thermally conductive, electrically insulating material.

In many embodiments of the above aspects the or each compartment may be sized and shaped to accommodate a or a respective battery cell. Thus, in such embodiments the or each compartment may comprise a defining side wall whose internal surface is, at least in part, cylindrical or part-cylindrical. In some such embodiments the or the respective compartment may be of a size such that an intended cell fits therein with at least part of its casing's outer wall in contact or abutment with at least the cylindrical or part-cylindrical portion(s) of the internal surface(s) of the or the respective compartment. This manner of substantially matching the internal size and shape of the respective compartments to the respective cells which they are to accommodate may assist not only in restraining each cell in an optimum position to avoid deleterious effects of excessive vibrations or other displaceive movements caused by vehicle operation or motion, but it may also help to correctly align individual cells for the purposes of reliably forming required electrical connections to the one or more terminals thereof in a finally assembled battery module.

Thus, in some embodiments each compartment may have an internal side wall which is configured as at least a portion of a substantially right cylinder.

Alternatively, in other embodiments each compartment may have an internal side wall which is configured as at least a portion of a cone or otherwise tapered or oriented non-perpendicularly to a general medial plane through the length of the housing array. Such embodiments may be especially useful in the case of some typical commercially available "cylindrical" battery cells, which may often vary slightly in diameter along their axial length, with the cell diameter at one axial pole being larger than the cell diameter at the opposite axial pole. For use in such embodiments, therefore, the internal side wall(s) of each compartment of the housing may be so shaped or configured to substantially match any such variation in cell diameter along its axial length, e.g. by having a geometrically similar or substantially identical tapering or conical shape passing from one axial end of the compartment to the opposite axial end thereof. Again, this shape matching may desirably be whilst ensuring that there is surface-to-surface contact or abutment between at least part of the outer wall of the respective cell casing and the internal wall of the respective compartment once the respective cell is accommodated therewithin.

Further alternatively, in yet another example form, each compartment may even be polygonal in cross-section.

In many embodiments the cell housing may comprise a plurality of compartments. The compartments may optionally be arranged in an array of side-by-side compartments, each compartment being joined or attached or connected to at least one, optionally two to more, further optionally three or more, adjacent or neighbouring compartments.

The joining or attachment or connection of any one compartment to any one other compartment may in some embodiments be by virtue of those two compartments having respective side walls which are at least partially united, bonded, adhered, fused or welded together, and/or which are integrally formed such as by being integrally moulded or otherwise integrally formed. Such integral moulding may be effected during the moulding process by which the array of compartments is formed.

In some embodiment forms any one compartment and any one other compartment adjacent thereto may have at least one side wall, or a portion of at least one side wall, in common.

In some embodiments a complete array of compartments constituting a single cell housing unit or arrangement, e.g. for use as the cell housing for a single battery module, may be formed by a unitary overall moulding process.

In some embodiments the array of compartments forming the body of a cell housing unit or arrangement may comprise a plurality of compartments which are grouped together in discrete groups of two or more, or three or more, or possibly even four or more, compartments per group. In some such embodiments the compartments may be grouped together in discrete groups of two or more different ones of the aforesaid numbers of compartments per group. The defining of such discrete groups of compartments may in some embodiments be by virtue of:
 (i) each compartment within each group may have an internal side wall which is configured in cross-section as an arc, especially a substantially circular arc; and
 (ii) compartments within each group may be joined or attached or connected to each immediately adjacent or neighbouring compartment within that group by means of the respective ends of the said arced side wall of the said adjacent or neighbouring compartments being united with each other.

Optionally in such arrangements: (iii) each compartment within a given group may be joined or attached or connected to an immediately adjacent or neighbouring compartment within an adjacent or neighbouring group by means of the respective side walls of that pair of compartments being joined or attached or connected via portions of their respective side walls intermediate or between the said ends of the respective arced side walls of the respective compartments of that pair.

In some embodiments therefore such configurational arrangements of groups of the various compartments may lead to the housing unit or arrangement resembling a "honeycomb"-like structure. In other words, in such arrangements compartments within each discrete group may each have the appearance, in plan view, of a "lobe" of a plural-lobed moulding. Thus, in such embodiments each group of two or more compartments may be shaped and/or configured as a plural-lobed housing portion, especially a plural-lobed moulding. Within each group the compartments may be arranged substantially symmetrically about a central axis, especially rotationally symmetrically about that central axis, when viewed in plan.

In some such embodiments the housing may comprise at least one or more groups of compartments which comprise three compartments defined in the above manner, whereby the or each said group may resemble a three-lobed "trefoil" or "cloverleaf" in plan view.

In other such embodiments the housing may comprise at least one or more groups of compartments which comprise another number of compartments, e.g. two or four, for instance, defined in the above manner, whereby the or each said group may resemble, respectively, a two-lobed "bifoil" or a four-lobed "quatrefoil" in plan view.

In yet other such embodiments, the housing may comprise two or more different species of groups of compartments, each of which species may independently be of the above-defined three-lobed or "trefoil" or "cloverleaf" configuration, or the two-lobed or "bifoil" configuration, or the four-lobed "quatrefoil" configuration. Any suitable combination of two or more such different species of groups of compartments may be employed, for example depending on their efficiency in being able to be close-packed or in filling space, and/or depending on how well such arrangements may optimise the thicknesses, shapes and layouts of compartment side walls in such a way as to beneficially effect their overall heat transfer and distribution characteristics.

Thus, in many embodiment arrangements the compartments in a given cell housing unit or arrangement may, in plan view, take the form of a tessellation, with each tessellated unit comprising a said group of two, three (especially), or four or possibly more, compartments. The provision of predominantly three compartments per group may in some embodiments be desirable, especially over at least a major proportion of the groups of a given cell housing array, since that configurational arrangement may enable an optimising of a degree of "close-packing" of the compartments relative to one another within each group and as between groups. This may also lead beneficially to a more uniform or narrower range of side wall thicknesses in the various conjoined compartments, which may lead to improved levels of uniformity and/or equilibration of thermal transfer via the various respective side walls of the various compartments across the cell housing unit or arrangement. However, even in such arrangements, it may still be possible or desirable for one or more regions, e.g. an edge or side region, of the array to comprise a number of groups of other than three compartments, e.g. two compartments per group, in order to optimise the space-occupying effectiveness of the overall arrangement.

In some embodiments in which a plurality of compartments forming the array are provided grouped together in discrete groups, the groups of compartments may comprise a plurality of groups and the groups may be arranged in one or more linear rows. The groups in the or each linear row may lie in a substantially straight line relative to one another. Where two or more such rows of groups of compartments are provided, the rows may be arranged substantially parallel to one another.

In some such embodiment forms the groups of compartments in a given row may be equi-spaced. The groups of compartments in a given row may all have the same orientation and/or be geometrically identical or similar.

In some such embodiment forms the groups of compartments in one given row may be oriented in a different orientation, e.g. a different rotational orientation, especially rotated by an angle corresponding to the group's order of rotational symmetry about a central axis thereof,—especially when viewed in plan—as the groups of compartments in an immediately adjacent row. Alternatively, the groups of compartments in one given row may be oriented in the same or an identical orientation—especially when viewed in plan—as the groups of compartments in an immediately adjacent row.

In some such embodiments the groups of compartments in one given row may be equi-spaced within but linearly displaced along the row relative to the groups of compartments in an immediately adjacent row, whereby the groups in the one row are located between, or in the vicinity of gaps inbetween, groups of compartments in the immediately adjacent row. In some such embodiment forms of this configurational arrangement, the groups of compartments in the one given row may protrude, e.g. a short distance (such as about 0.5 or 1 or 2 or 3 or 4 or 5 up to about 7 or 8 or 10 or 12 or 15 or 20 or 25 or 30 or 35 or 40 or 45 or 50% of the diameter or width of a single compartment), into a gap or space between individual groups of compartments in the immediately adjacent row.

Other shapes of individual compartments, and relative spatial arrangements and distributions of compartments relative to each other within a given respective group, and of groups relative to each other, other than any of those defined above, may of course be possible.

Some specific example embodiments illustrating some of the above-defined spatial arrangements of compartments arranged in groups will be further described in detail below in the context of some specific practical embodiments of the cell housing of this aspect of the invention.

In embodiments of the cell housing the thermally conductive, electrically insulating material may be formed into the array of the one or more compartments by a moulding process. Practical examples of suitable moulding processes and apparatuses are well-known in the art of industrial moulding and industrial manufacture of moulded articles.

However, other manufacturing methods may be used instead, if desired or appropriate, such as an extrusion process.

In embodiments of the cell housing the material of the body forming the cell housing may be of any suitable thermally conductive, yet electrically insulating, material. Generally the material of the body may be selected so as to provide an optimum balance between its thermal conductivity and a required level of heat transfer through the material, also taking into account its electrical strength against a required level of electrical isolation between the cells and/or busbar connectors within or surrounding the housing.

In some embodiments the material may comprise a matrix of an electrically insulating material, having dispersed or distributed therewithin particles of a thermally conductive material.

In some such embodiments the electrically insulating material forming the matrix may be any suitable material, especially a plastics material, such as a natural or synthetic polymeric material or resin, having a suitably high electrical resistivity. Suitable examples of such electrical insulating plastics material may include GRP (glass-reinforced plastics), or the corresponding matrix plastics material from which known GRP materials are made. Suitable examples of electrically insulating GRP materials are widely available in the art of industrial plastics for various applications, and may comprise a matrix or binder of a variety of resins or polymers (e.g. epoxy, thermoplastic or thermosetting), for instance an isophthalic polyester resin, and may have distributed therein an array or network of glass fibres. Further examples of the matric material may include various ceramic-reinforced plastics, which may be considered as counterparts of GRPs, but with fibres or strands of ceramic material embedded therein instead. Practical examples of such ceramic-reinforced plastics are also well-known per se in the art.

In some such embodiments the thermally conductive material dispersed or distributed in the matrix may comprise particles of any suitable material having a suitably high thermal conductivity. Examples of suitable thermally conductive materials for use as the dispersed or distributed particles may include various predominantly non-metallic materials, e.g. certain ceramic materials, or thermally conductive polymers. Some practical examples of suitable such materials include: bauxite, alumina (aluminium oxide), polyphenylene sulfide (PPS, such as that from Celanese Corporation).

In some embodiments the particles of thermally conductive material may be dispersed or distributed substantially uniformly throughout the matrix of electrically insulating material. This may serve to assist uniform conductance of heat within the material of the cell housing.

However, in other embodiments it may be possible to tailor one or more specific sites or regions within a cell housing array or arrangement to have a different distribution density of particles of the thermally conductive material from one or more other sites or regions, so that such one or more such sites or regions have tailored thermal conductivity characteristics that are different from one or more other such sites or regions. In designing a cell housing in this manner it may be possible to better tailor heat transfer properties of individual sites or regions within the overall housing to better suit or meet the heat transfer needs of such site or regions, which may ultimately lead to a cell housing arrangement with overall further improved heat conductance or transfer properties.

In some embodiments the thermally conductive material dispersed or distributed in the matrix may be present as particles of any suitable size and shape. The particles may for instance have an average (mean) particle width or diameter in the approximate range of up to about 1 or 2 or 3 or 5 or 8 or 10 or 20 or 30 or 40 or 50 or 75 or 100 or 200 or 400 or 600 or 800 or 1000 microns (1 mm), or possibly even up to 1 or 2 or 3 or 5 mm. The particles may for instance be substantially regularly or symmetrically shaped particles, or they may be in the form of irregularly or asymmetrically shaped particles, e.g. flakes, which is to say they comprise flattened bodies of the material, e.g. having one or more, optionally a pair of opposed, faces with at least one lateral dimension or a surface area which is significantly greater or significantly smaller than the corresponding dimension or surface area of one or more of its other faces.

Other shapes of particles of the thermally conductive material may however be possible in other embodiment forms.

The relative proportions of the electrically insulating matrix material and the material forming the dispersed thermally conductive particles may vary depending on the individual thermal properties required of the cell housing material once moulded into its final shape and spatial arrangement of compartments.

By way of example, the electrically insulating matrix material may for instance make up from about 50 or 60 or 70 or 80 or 89 or 90% by weight up to about 90 or 91 or 92 or 95 or 97 or 98 or 99% by weight of the housing material. Conversely, the thermally conductive material dispersed or distributed as particles in the matrix may for instance make up from about 1 or 2 or 3 or 5 or 8 or 9 or 10% by weight up to about 10 or 11 or 20 or 30 or 40 or 50% by weight of the housing material. However, precise relative proportions of the two principal components may be selected in any given practical scenario in accordance with principles and techniques well-known to the skilled person versed in the art of industrial moulding materials, in order to arrive at a housing material having optimum thermal conductivity properties to suit any specific battery module demands.

In manufacturing embodiments of the housing material aspects of the invention the particles of thermally conductive material may be incorporated into the material forming the matrix of electrically insulating material by any suitable means, practical examples of which will be well-known in the art of plastics composites manufacture. For example, the particles may be incorporated by mixing them into the base material which is to form the matrix, either simply before the matrix material itself is subjected to a moulding or other forming stage, or in a pre-manufacturing stage during the manufacture of the matrix material itself.

If desired or necessary, e.g. for improving mouldability or handling or resultant other physical properties, a small amount of one or more adjunct or auxiliary substances or compounds may be included in the housing material, e.g. in an amount of up to about 0.01 or 0.05 or 0.1 or 0.2 or 0.5 or 1 or 1.5 or 2% by weight of the housing material, provided the identity and amount thereof does not deleteriously affect the target thermal properties of the resultant housing material.

Thus, in practising various embodiments of the cell housing according to the foregoing aspects, owing to the thermally conductive particulate filling within the electrically insulating matrix, the housing material itself is able to thermally manage each cell accommodated in individual respective compartments thereof such as through surface-to-surface contact of the housing material with the cell casing material. This enables heat to either diffuse from the cell into the housing material for cooling purposes or for heat to diffuse into the cell for heating purposes, as required. The diffusion of heat within the housing's overall mass thereby provides a means of balancing the heat distribution across all of the cells collectively contained within the housing.

Going further, in many practical embodiments, owing to the thermally conductive particulate filling within the electrically insulating matrix, the housing material itself may then be able to further diffuse heat such as through onward surface-to-surface contact into either an active cooling or heating component, such as a heat exchanger device, cooling plate, cooling tube or other thermal transfer device.

Owing to the thermally conductive particulate filling within the electrically insulating matrix, the housing material thus ensures that there is no or minimal potential for short-circuits to occur between an individual cell's electrical poles, or between the electrical poles of adjacent or neighbouring cells, or between busbars or other connectors or conductors that may be present in contact with a cell's electrical pole and possibly some other component(s) within an overall battery module or battery pack or assembly.

In some embodiments the cell compartments formed in the housing may be shaped so as to provided optimisation between being able to provide sufficient energy density within a given material volume, e.g. dependent on the planar space restrictions within an overall battery module, and being able to provide sufficient transfer of heat from, or to, or between cells whilst minimising the effects of any cell and housing moulding dimensional variations.

In some embodiments the cell housing may be further designed so as to include one or more additional useful features that may assist in the attachment or fitting or mounting to or in a battery module or battery pack or assembly one or other components, such as one or more busbar connectors or other conductors or connectors or one or more heat exchange devices.

For example, the material of the cell housing body may be formed with one or more lugs, shoulders, protrusions, pins, stakes, recesses, holes, detents or other engagement elements for enabling the attachment or securement of a busbar or other connector or conductor which may be joined to a respective cell pole or terminal with one or more separate fixings. In one such example, for instance, such a feature may be achieved by creating pins or stakes or lugs as part of the housing moulding, which upon assembly of a battery module may be passed through an aperture in a busbar or other conductor or connector, and a terminal end of the pin or stake thereafter being deformed, e.g. using ultrasonics or hot air or a like method, to create an enlarged retaining head.

Other practical examples of such auxiliary mounting, retention, securement or engagement features formed in the cell housing body may of course be possible.

In the assembly of a battery module, and also in the assembly of a battery pack comprising one or more battery modules, busbars are used to electrically connect together the cells within a given cell housing in a given battery module, as well as to interconnect adjacent modules in the assembly of a complete battery pack. Hitherto, however, little attention has been paid to the design of the busbars themselves, especially in terms of how their shape and configuration may affect current densities and current distributions within a given busbar, which may in turn influence their thermal conduction properties and how a given busbar may contribute to an overall heat distribution within a given battery module or specific transfers of heat towards or away from or across particular components of a given battery module, notably the cells themselves.

As a result of our investigations, we have found that by designing a busbar to have certain novel features of shape and configuration, it may be possible to control or adjust or tailor current densities and current distributions at particular points and/or positions and/or regions therewithin, which may be exploited to good effect in further optimising heat transfers and heat distributions within a battery module, and in particular between individual cells and across cell arrays in such a module. In some cases such improved control of current densities and current distributions may lead to advantageous effects of "equilibration" or "evening out" of variations in current densities and distributions, i.e. the reduction of "hot-spots", across or through specific portions of the busbar, thereby leading to improved or at least more reliable contributions of the busbar to overall heat—especially equilibrated heat distributions—within a given battery module, especially across the cells thereof, and/or between modules in an assembled battery pack.

Accordingly, in various other aspects of the present invention there are provided a busbar connector, a method of making the busbar connector, a battery module comprising one or more of the busbar connectors, a battery comprising one or more battery modules each comprising one or more of the busbar connectors, and a vehicle comprising the battery or at least one battery module each comprising one or more of the busbar connectors.

Accordingly, in another aspect of the present invention for which protection is sought there is provided a busbar connector for making one or more electrical connections within or to a battery module of a battery pack, the battery module comprising one or more battery cells, wherein the busbar connector comprises:

a base portion for forming an electrical connection to one or more of the battery cells within the module, and at least one connector portion for forming an electrical connection from the base portion to one or more other components of the module or the battery pack, wherein the at least one connector portion has a non-uniform transverse cross-sectional area passing therealong.

In another aspect of the present invention for which protection is sought there is provided a busbar connector for making one or more electrical connections within or to a battery module of a battery pack, the battery module comprising one or more battery cells, wherein the busbar connector comprises:

a base portion for forming an electrical connection to one or more of the battery cells within the module, and at least one connector portion for forming an electrical connection from the base portion to one or more other components of the module or the battery pack, wherein the at least one connector portion has a lateral width which varies passing therealong.

In another aspect of the present invention for which protection is sought there is provided a busbar connector for making one or more electrical connections within or to a battery module of a battery pack, the battery module comprising one or more battery cells, wherein the busbar connector comprises:

a base portion for forming an electrical connection to one or more of the battery cells within the module, the base portion having a longitudinal length, and at least one connector portion for forming an electrical connection from the base portion to one or more other components of the module or the battery pack, wherein the base portion and the at least one connector portion are united or joined via an attachment portion, the attachment portion having a length dimension, in the same direction as the longitudinal length of the base portion, which is greater than the lateral width of the at least one connector portion at locations therealong spaced or distal from the attachment portion.

In some embodiments of the preceding aspect, the longitudinal length dimension of the attachment portion may correspond to at least a majority portion of the longitudinal length of the base portion, which is to say that the longitudinal length dimension of the attachment portion may be at least about 50 or 55 or 60 or 65 or 70 or 75 or 80 or 85 or 90% of the longitudinal length of the base portion.

In some such embodiments the attachment portion may be or comprise a fold or an angled portion. In some such embodiments the angle of the fold or angled portion may be approximately a right angle (i.e. approximately 90°. This may facilitate the placement of the at least one connector portion against or adjacent a side wall of a cell housing, when the base portion is placed against or adjacent an upper side or a lower side of the cell housing where typically connections are made to one or other of the poles or terminals of each cell.

In yet another aspect of the present invention for which protection is sought there is provided a busbar connector for making one or more electrical connections within or to a battery module of a battery pack, the battery module comprising one or more battery cells contained within a cell housing, wherein the busbar connector comprises:

a base portion for forming an electrical connection to one or more of the battery cells within the module, and at least one connector portion for forming an electrical connection from the base portion to one or more other components of the module or the battery pack, wherein the base portion and the at least one connector portion are configured relative to each other such that they are placeable against different but adjacent sides or faces of the cell housing.

In any of the preceding four aspects the connector portion may extend from a lateral side of the base portion.

In yet another aspect of the present invention for which protection is sought there is provided a busbar connector for making one or more electrical connections within or to a battery module of a battery pack, the battery module comprising one or more battery cells, wherein the busbar connector comprises:

a base portion for forming an electrical connection to one or more of the battery cells within the module, the base portion having a longitudinal length, and at least one connector portion for forming an electrical connection from the base portion to one or more other components of the module or the battery pack, wherein the at least one connector portion extends transversely from a lateral side of the base portion, and further extends in a general length direction thereof which lies at an angle relative to the longitudinal length direction of the base portion, wherein the said angle lies in the approximate range of from greater than about 0 or 2 or 5 or 10 or 15 or 20 or 25° up to about 30 or 40 or 50 or 60 or 70 or 80 or 90° relative to the longitudinal length direction of the base portion.

In another aspect of the present invention for which protection is sought there is provided a blank of electrically conductive material having a base portion and at least one connector portion as defined in any of the above-defined preceding aspects, for forming, e.g. by folding or bending or shaping, into the busbar connector of any of the above-defined preceding aspects of the invention.

In another aspect of the present invention for which protection is sought there is provided a battery module comprising at least one busbar connector, wherein the busbar connector is a busbar connector according to any one of the above-defined preceding aspects.

In yet another aspect of the present invention for which protection is sought there is provided a battery comprising one or more battery modules, wherein the or each battery module, or at least one of the battery modules, comprises or is fitted with at least one busbar connector, the or each busbar connector being a busbar connector according to any one of the above-defined preceding aspects.

In yet another aspect of the present invention for which protection is sought there is provided a vehicle including a battery comprising one or more battery modules, wherein the or each battery module, or at least one of the battery modules, comprises or is fitted with at least one busbar connector, the or each busbar connector being a busbar connector according to any one of the above-defined preceding aspects.

In any of the battery module, battery or vehicle defined in the preceding or following paragraphs as busbar connectors according to aspects of this invention, one or more of the subject busbar connectors may be employed independently of the use or inclusion of any heat exchanger device(s) and/or, independently, any cell housing(s) also disclosed elsewhere in this specification. Furthermore, one or more of the subject busbar connectors may be employed independently of the optional use or inclusion of any known heat exchanger device and/or, independently, any known cell housing already available or known from the prior art.

In yet another aspect of the present invention for which protection is sought there is provided a method of making a busbar connector, comprising:

providing a blank of electrically conductive material having a first portion corresponding to and for forming the said base portion as defined in any of the above-defined preceding aspects, and at least one second portion corresponding to and for forming the or a respective said connector portion as defined in any of the above-defined preceding aspects; and forming the said blank, e.g. by folding or bending or shaping, into the said busbar connector according to the respective said aspect.

In practical examples of embodiment busbar connectors made according to the method of the preceding aspect, the busbar connector may thus conveniently be made from a single sheet of the electrically conductive material, with respective sections or portions thereof having been appropriately formed, moulded, cut, stamped or otherwise machined into the required shape and configuration to form the respective base portion and connector portion or portions of the finished busbar connector.

In many embodiments of any of the above aspects the busbar may comprise a pair of connector portions, each said connector portion extending away from a respective lateral side of the base portion. The pair of connector portions may, especially, extend away from respective opposite lateral sides of the base portion. In such embodiments, therefore, the pair of connector portions may be arranged or configured to bear against or abut respective ones of a pair of opposite lateral side faces of a cell housing, with the base portion lying against on in abutment or adjacent an upper or a lower face of the cell housing, where connections are made to the respective cells accommodated within the housing.

In some such embodiments various ones of the above-defined shapes and/or configurations of the respective connector portions of the respective busbar connectors of the pair may be such that the respective connector portions of different, discrete, busbar connectors on each respective lateral side of a given cell housing bear against or abut different respective regions of the same lateral side, wherein said regions are separated from each other by a distance sufficient to electrically insulate the two connector portions from each other on that lateral side of the cell housing.

In many embodiments the base portion may have a general shape which is generally substantially flat or planar. This may facilitate the placement of the base portion over or against or into abutment with the relevant poles or terminals of an array of side-by-side-arranged battery cells in a given cell housing with or to or on which the busbar is to be used, fitted or mounted.

In many embodiments the or each connector portion may have a general shape which is substantially flat or planar. In some such embodiments, where a pair of connector portions is provided, the pair of connector portions may be oriented substantially parallel to each other. This may facilitate the placement of the or each connector portion over or against or into abutment with a respective side face or surface of a given cell housing with or to or on which the busbar is to be used, fitted or mounted, in many embodiments that respective side face or surface being adjacent a top or bottom face of the housing on or in which are located the respective poles or terminals of the cells of the array accommodated therein.

In some embodiments the pair of connector portions may be configured so as to be generally geometrically substantially identical to one another, but a mirror image of one another.

In some embodiments of any of the above aspects, the or each connector portion may be joined or united to or with the base portion at an angle relative thereto, wherein the angle is approximately a right angle (i.e. approximately 90°). As already mentioned above, this may facilitate the placement of the at least one connector portion against or adjacent a side wall of a cell housing, when the base portion is placed against or adjacent an upper side or a lower side of the cell housing where typically connections are made to one or other of the poles or terminals of each cell. However, other angles of joining or uniting may be possible in other embodiments, depending for example on the overall shape and configuration of the housing and/or the arrangement of the cells accommodated therein.

In some embodiments of the busbar connector according to various of the above aspects, the or each connector portion may be generally substantially triangular in shape (when viewed side-on). In some such embodiments a major side of the triangle opposite its hypotenuse may form a site or line of connection or attachment or joining of the respective connector portion to the base portion. That site or line of connection or attachment or joining may in some such embodiments be an integral connection or uniting of the material of the respective connector and base portions.

Alternatively in some embodiments of the busbar connector according to various of the above aspects, the or each connector portion may be generally tapered (when viewed side-on), narrowing in its lateral width dimension passing from its site or line of connection or attachment or joining to the base portion towards an end thereof distal from the base portion. Again, that site or line of connection or attachment or joining may in some such embodiments be an integral connection or uniting of the material of the respective connector and base portions.

In many embodiments of the busbar connector of any of the above aspects, the electrically conductive material may comprise a metal or a metal alloy, or a combination of two or more metals or metal alloys. In many such embodiments the metal may comprise copper or an alloy of copper. However, in other embodiments one or more other suitably electrically conductive metals, metal alloys or other materials may be used, if available and appropriate.

In some embodiments of the busbar connector of any of the above aspects, the base portion may be apertured or foraminate, whereby it may comprise or contain a plurality of apertures therein. The apertures may be generally part-rectangular or arcuate, or even part-circular, in shape (when viewed in plan). The apertures may be arranged in an array, wherein each aperture may correspond to and may be positioned or located in the vicinity or locality of or adjacent to a corresponding location of a respective pole or terminal of a cell to be accommodated in a respective compartment in a cell housing when the busbar connector is fitted to or mounted on a respective cell array of a respective battery module.

In some such embodiments, within each respective aperture the material of the base portion may be formed into a tongue or protrusion or extension which protrudes or extends into the respective aperture from a peripheral side thereof. In some such embodiments the tongue or protrusion or extension may be configured so as to lie out of, especially below, a general plane of the base portion.

In some such embodiments the material forming the or each tongue or protrusion or extension may have a reduced thickness which is less than the thickness of the material of the base portion which surrounds the respective aperture. Furthermore, in some such embodiment forms the material forming the or each tongue or protrusion or extension may have a reduced thickness which is approximately equal to a thickness of a material forming a cell pole or terminal itself, or a material forming a casing wall of a cell, which is to be electrically connected to the respective tongue or protrusion or extension by a process involving welding. This feature may serve to assist in making an efficient and secure welded connection between the respective tongue or protrusion or extension and a respective cell pole or terminal.

As defined above, in some embodiments of the busbar connector of various of the above aspects, the at least one connector portion may extend transversely from a lateral side of the base portion, and may further extend in a general length direction thereof which lies at an angle relative to the longitudinal length direction of the base portion, wherein the said angle lies in the approximate range of from greater than about 0 or 2 or 5 or 10 or 15 or 20 or 25° up to about 30 or 40 or 50 or 60 or 70 or 80 or 90° relative to the longitudinal length direction of the base portion. In some such embodiments the or the respective connector portion may thus be configured with a "swept-back" or "swept-forward" configuration (depending on whether the general length direction in which the connector portion is considered, or is defined, as extending is towards a rear end or a forward end of the base portion of the busbar connector).

In some such embodiments the respective directions towards the aforesaid rear end or forward end, as the case may be, in which the respective connector portions are considered, or are defined, as extending, may each independently be or correspond to a longitudinal direction of the base portion in which, when in use, a voltage gradient or a current density increases, or alternatively decreases, passing longitudinally along the base portion of the busbar connector. In particular, in some such embodiments the longitudinal direction of "sweeping-back" or "sweeping-forward" of the respective connector portions may be or correspond to a longitudinal direction of the base portion in which, when in use, a voltage gradient or a current density increases passing longitudinally therealong. This "swept-back" or "swept-forward" configuration of the or the respective connector portion may in such instances assist in the "equilibration" or "evening out" of variations in current densities and distributions across or through specific portions of the busbar connector, thereby leading to improved or at least more reliable contributions of the busbar connector to overall heat distributions—especially equilibrated heat distributions—within a given battery module, especially across the cells thereof, and/or between modules in an assembled battery pack.

However, in other embodiments other spatial or configurational relationships between the direction, and/or angle relative to the general plane of the base portion, and/or shape of the or each connector portion, relative to a voltage gradient and/or current density increase or decrease passing along the base portion of the busbar connector in the said longitudinal direction thereof, may be possible.

In some embodiments of the busbar connector of various of the above aspects, the or each connector portion may terminate in an electrical interconnection end portion distal from the base portion. In some such embodiments the or each terminal interconnection end portion may extend in a direction parallel to the longitudinal direction of the base portion. In some such embodiments the or each terminal interconnection end portion may extend a distance, especially a short distance (such as up to about 1 or 2 or 5 or 8 or 10 or 12 or 15 or 20% of the longitudinal length of the base portion), beyond the longitudinal limit of the base portion, whereby the or each respective terminal interconnection end portion may be configured to be electrically interconnectable to another, like terminal interconnection end portion of another, like connector portion of another, like busbar connector provided on an adjacent or sequentially next battery module in a series of battery modules in an overall battery pack or assembly. In this manner adjacent or sequentially next battery modules in a battery pack or assembly may be conveniently electrically connected together via the respective busbar connectors in each module, in order to fulfil the overall electrical supply parameters of the battery pack or assembly.

In some such embodiments, in order to facilitate the making of such electrical interconnections between adjacent or sequentially next interconnection end portions of respective connector portions of respective busbar connectors in adjacent or sequentially next modules, the respective interconnection end portions may each be connected to its respective connector portion by a step or ramp, whereby a stepped or ramped interconnection end portion on one busbar connector's connector portion may be more readily placed into side-by-side electrically conductive abutment with, e.g. by virtue of being welded or adhered to, a correspondingly, but oppositely, stepped or ramped interconnection end portion on the other busbar connector's connector portion.

In some embodiments of battery modules comprising one or more busbar connectors according to aspects or embodiments of the invention, at least two busbar connectors may be provided, mounted or fitted on or to any one given battery module. In some such embodiments the at least two busbar connectors may form a pair, optionally geometrically identical or similar to each other and optionally configured as mirror images of each other, wherein a base portion of a first one of the busbar connectors is mounted on, e.g. in abutment against, an upper major face of the module, and a base portion of a second one of the busbar connectors is mounted on, e.g. in abutment against, a lower, opposite major face of the module. In such embodiments the upper major face of the module may be an upper major face of a cell housing of the module that accommodates the battery cells of that module, and the lower major face of the module may be a lower major face of the cell housing, whereby each of the respective base portions of the two busbar connectors is in abutting electrical contact with the poles or terminals of the cells accommodated in the housing of the module on the respective upper and lower major faces thereof.

Also in such embodiments, as already mentioned in the context of some other embodiments, various ones of the above-defined shapes and/or configurations of the respective connector portions of the respective busbar connectors of the pair in each module may be such that the respective connector portions on each respective lateral side of the cell housing bear against or abut different respective regions of the same lateral side of the cell housing, wherein said regions are separated from each other by a distance sufficient to electrically insulate the two connector portions from each other on that lateral side of the cell housing or module. In some embodiment forms this relative configuration may be conveniently achieved and exploited, especially in terms of the ease with which adjacent modules may be electrical interconnected via their respective busbar connectors, by virtue of the two geometrically similar or identical (albeit mirror image) busbar connectors being oriented in a reversed longitudinal orientation relative to each other on the two opposite major faces of the cell housing or module.

Within the scope of this application it is envisaged and explicitly intended that the various aspects, embodiments, features, examples and alternatives, and in particular any of the variously defined and described individual features thereof, set out in any of the preceding paragraphs referring to any of the aspects disclosed herein, in the claims and/or in any part of the following description and/or accompanying drawings, may be taken and implemented independently or in any combination. For example, features described in connection with one particular embodiment or aspect are to be considered as applicable to and utilisable in all embodiments of all aspects, unless expressly stated otherwise or such features are, in such combinations, incompatible.

BRIEF DESCRIPTION OF THE DRAWINGS

Embodiments of the various aspects of the present invention will now be described, by way of example only, with reference to the accompanying drawings, which are to be considered as schematic drawings only, in which:

FIG. 3(*b*) is an enlarged bottom perspective view of a portion of the heat exchanger of FIG. 2;

DETAILED DESCRIPTION OF EMBODIMENTS

Figure 1:
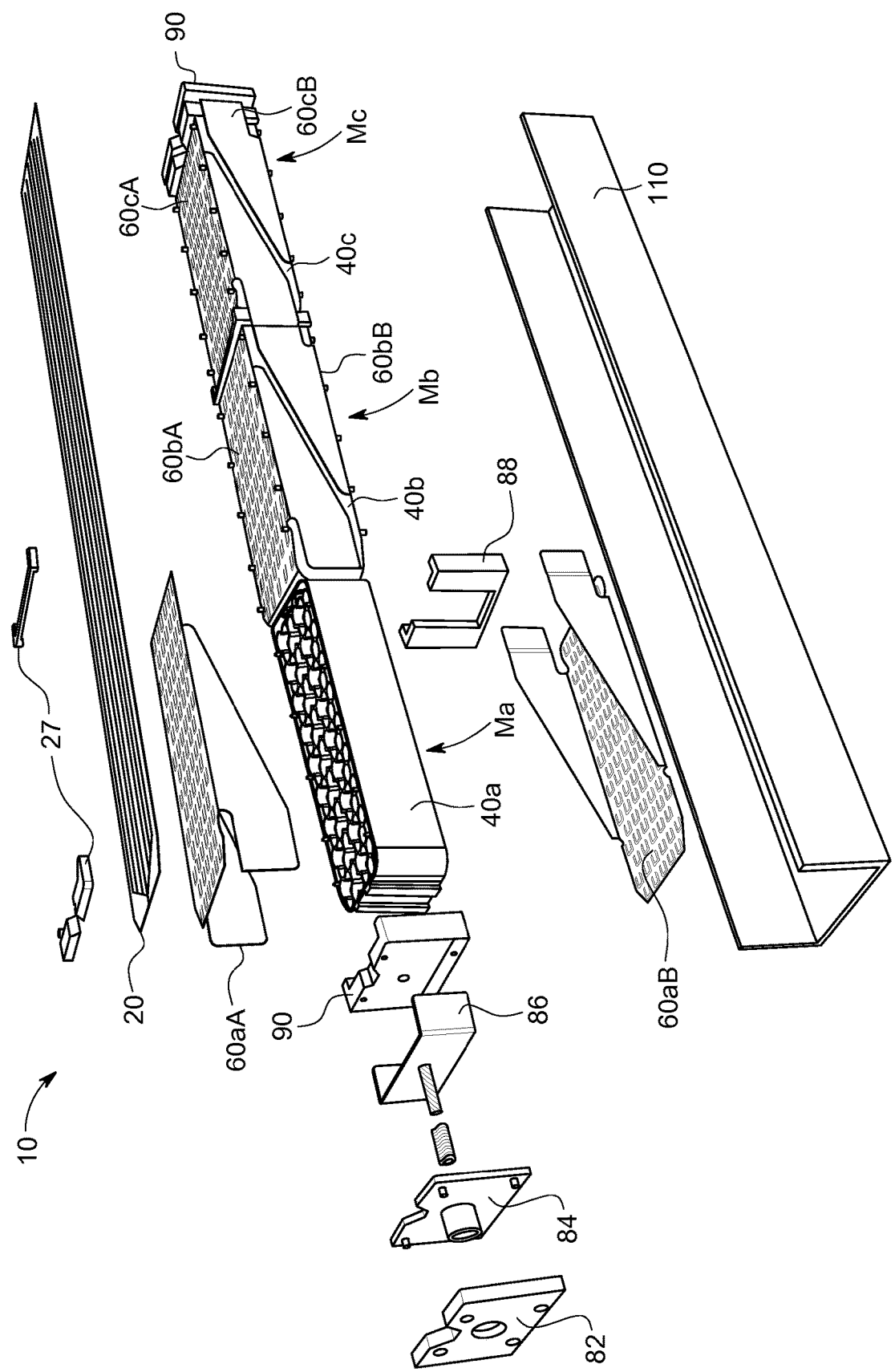
FIG. 1 is an exploded perspective view of a vehicle battery pack or assembly, comprising a series of a plurality of battery modules, showing at least some of its main components, including an embodiment of a heat exchanger, an embodiment of a cell housing, and an embodiment of a busbar connector, all being example embodiments of their own respective invention aspects.

Referring firstly to FIG. 1, this shows in exploded form the main components of a vehicle battery pack or assembly, showing at least some of its main components. The battery pack or assembly 10 comprises, generally, a linear series or array of physically and electrically interconnected but discrete battery modules Ma, Mb, Mc collectively contained within an elongate generally rectangular-sectioned outer casing, tray or trough 110, e.g. of an electrical insulating material such as a suitably rigid and strong plastics material. Each of the battery modules Ma, Mb, Mc comprises a respective moulded cell housing 40*a*, 40*b*, 40*c*, as will be described further below, each cell housing 40*a*, 40*b*, 40*c* being bounded on its various faces and sides by a respective pair of busbar connectors 60*a*A, 60*a*B; 60*b*A, 60*b*B; 60*c*A, 60*c*B; as will also be described further below. The upper side of the arrangement of cell housings and busbar connectors—and also the lower side thereof, if desired or necessary (although FIG. 1 does not show this option for clarity reasons)—is bounded by an elongate strip-like or panel-like heat exchanger device 20, e.g. supported by end-mounts 27, to facilitate heat transfer out of or away from the cells of each battery module during use, which heat exchanger device 20 will also be described further below.

The series or array of battery modules Ma, Mb, Mc are bounded on each end by a respective end-cap 90, e.g. of electrical insulating material, which also serve as respective anchoring sites for electrical end connection means 82, 84, 86 via which overall electrical connections are made to each respective end of the battery module array. If desired or necessary any given joint between immediately adjacent battery modules may be strengthened or stabilised, especially against being bent, by virtue of a support element, such as that shown as 88.

Figure 2:
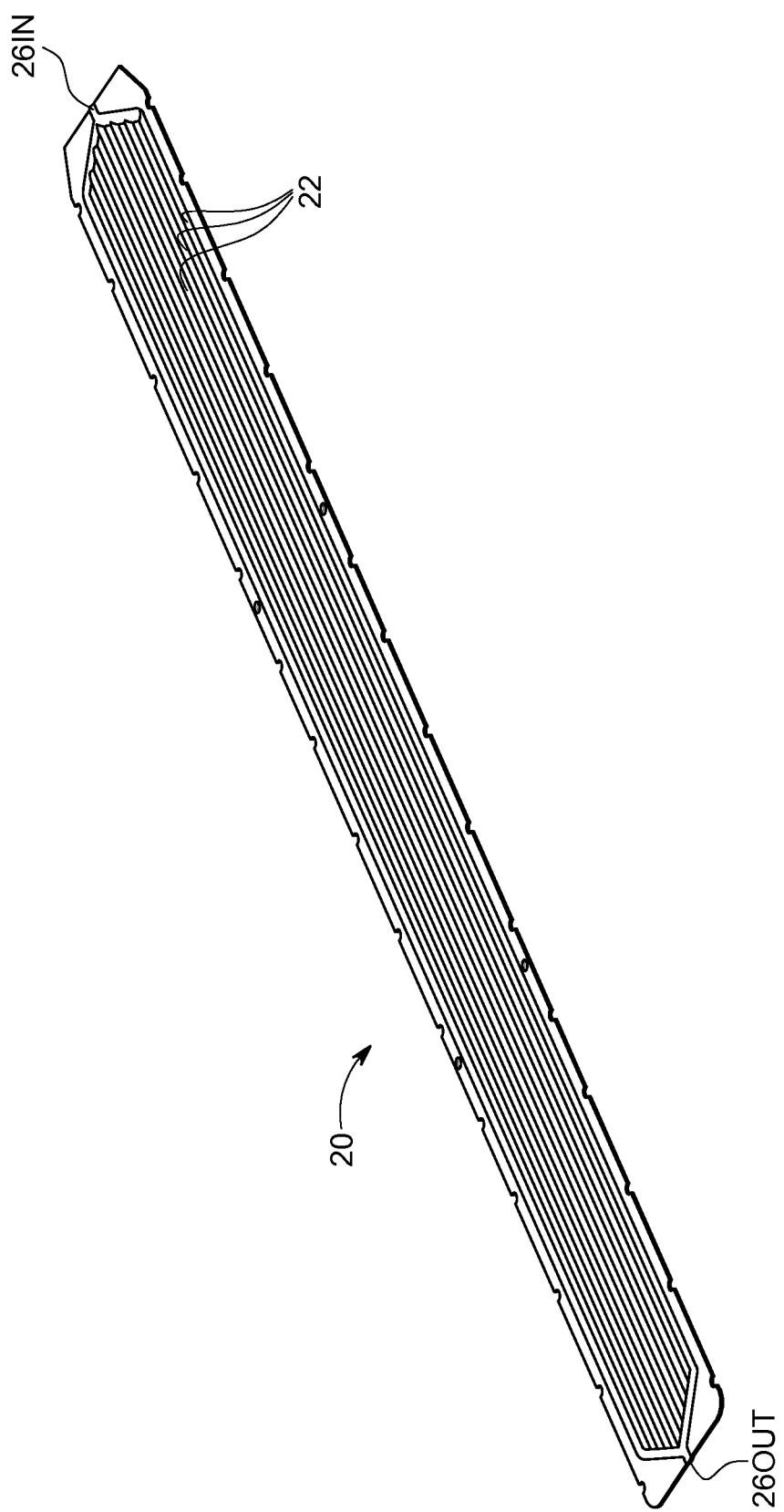
FIG. 2 is a top perspective view of the embodiment heat exchanger shown in the assembly of FIG. 1.
Figure 3A:
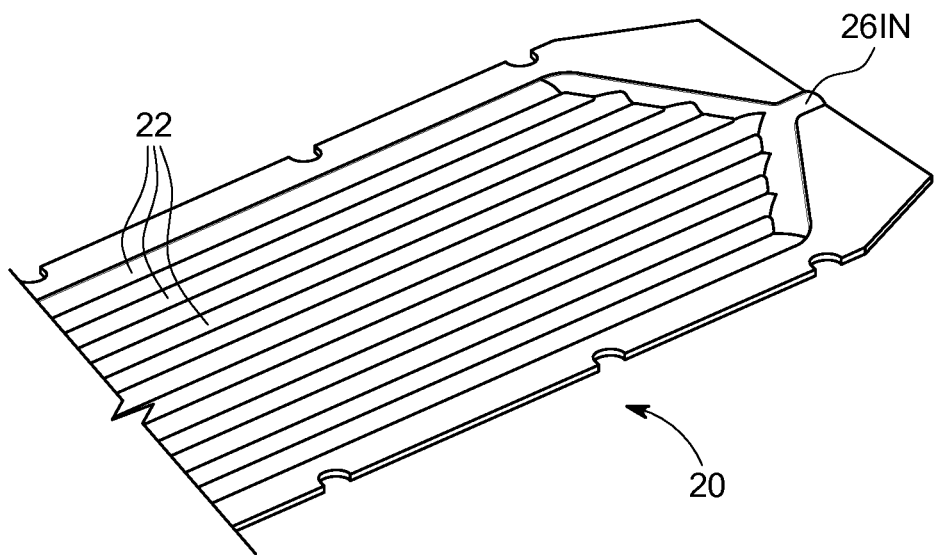
FIG. 3(*a*) is an enlarged top perspective view of a portion of the heat exchanger of FIG. 2.

FIGS. 2 and 3(*a*) and 3(*b*) show the heat exchanger device 20 in greater detail, which is a heat exchanger device 20 according to an embodiment of one or more of the heat exchanger aspects of the present invention.

The heat exchange device 20 comprises a generally somewhat flat or planar body of thermally conductive material, e.g. aluminium or an aluminium alloy, which has been coated on at least its underside surface 23 (as shown in FIG. 3(*b*)) with an electrically insulating coating. The body forming the basic structure of the heat exchanger device 20 comprises a network or array or system of conduits or channels 22 formed internally therewithin for flow therethrough of an appropriate thermal transfer fluid, e.g. a cooling or heating liquid. The conduits or channels 22 may be of any suitable cross-sectional size and shape, as for example the flow characteristics of the thermal transfer fluid in a particular embodiment device 20 may dictate. The thermal transfer fluid flows into the network, array or system of internal conduits or channels 22 via a fluid inlet 26IN, and out thereof via a fluid outlet 26OUT. Flow of the thermal fluid through the network, array or system of conduits or channels 22 may be effected and/or controlled by an appropriate pumping apparatus or system (not shown).

The internal conduits or channels 22 may conveniently be formed in the body of the heat exchanger device 20 by a process already in common use in the art of heat exchangers destined for refrigerators, for example. Such a method may, by way of example, involve selective or patterned bonding together of a pair of aluminium (or aluminium alloy) sheets, followed by expansion of non-bonded spaces inbetween the sheets to form the one or more conduits or channels. Such a method may be carried out using a modified roll-bonding or cold-welding technique and apparatus, wherein, in general terms:

(1) a pattern corresponding to the desired shape and configuration of conduits or channels 22 to be formed is applied to a surface of at least one of the pair of aluminium sheets, e.g. by a serigraphy or other printing technique, in the form of a resist or anti-bonding material applied only in selected regions or portions of the sheet surface corresponding to the pattern;

(2) the combined face-to-face sheets are then pre-heated, e.g. typically at a temperature of up to around 400° C.;

(3) rolling of the combined sheets is then carried out in a press, e.g. under typical pressures of up to around 600 tonnes; (4) annealing (for hardening purposes) is then carried out, e.g. by heat treatment at a temperature of up to around 450° C.;

(5) the roll-bonded sheets are then cooled (e.g. using water) and dried;

(6) the separation and expansion of the non-bonded regions or portions of the bonded sheets corresponding to the initially applied pattern is then accomplished by pumping into the exposed opening(s) thereof an expansion fluid, e.g. a gas such as compressed air, at a suitable elevated pressure, e.g. in the range of from about 90 to about 130 bar.

Suitable apparatus and precise processing parameters and conditions for carrying out practical examples of the above process will be readily apparent to the skilled person and within their general skill and knowledge.

Figure 3B:
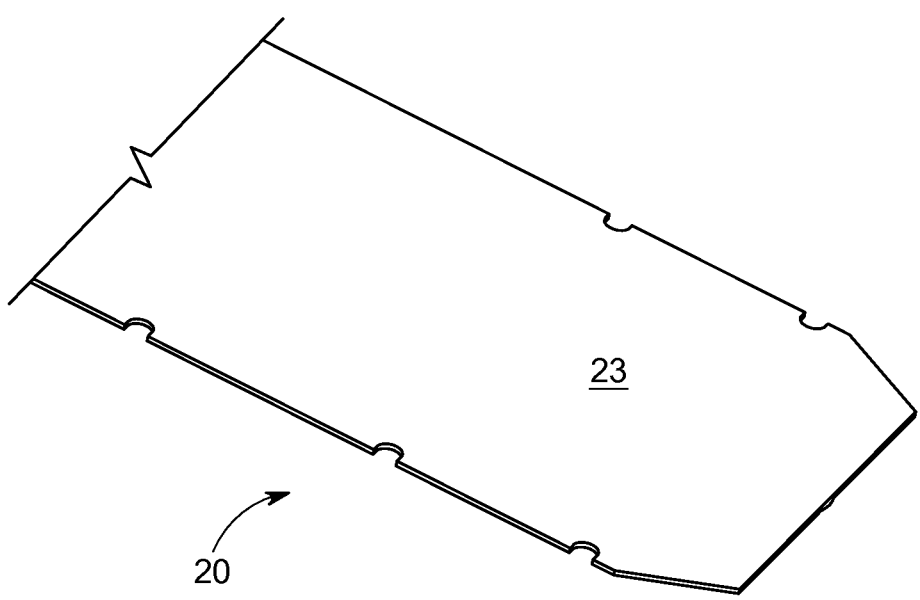

In order to produce a heat exchanger device 20 of optimum heat transfer characteristics when placed into contact or abutment with the respective busbar connectors 60*a*A, 60*b*A, 60*c*A atop the respective upper faces of the respective cell housings 40a, 40b, 40c of the respective modules Ma, Mb, Mc, the underside 23 of the heat exchanger device may be designed, as shown in FIG. 3(b), to be substantially flat or planar, with only the upper side of the device 20 being contoured or rippled or shaped to display or accommodated the various conduits or channels 2 formed with the body of the device 20. The provision of such structural variations is within the general knowledge and skill of the person skilled in the art and versed in the art of heat exchanger manufacture.

Once the basic body—or "substrate", as it may alternatively be termed in the description that follows—of the heat exchanger device 20 has been formed, it is then subjected to a further processing stage in which there is applied or fabricated directly onto at least one surface thereof—which in many practical forms may be at least its underside 23—a coating of an electrically insulating material. Such an electrically insulating coating may be applied or fabricated as follows:

The electrically insulating coating layer is formed on the aluminium substrate (i.e. the pre-formed body of the heat exchanger device 20) from a polysiloxane material.

The aluminium substrate (i.e. the pre-formed body of the heat exchanger device 20) is initially provided as an anodised substrate, having been subjected to an anodic oxidation process to form a porous layer of aluminium oxide ($Al_2O_3$) over the surface thereof. The porous layer has a plurality of pores provided therein and provides an anodised surface layer over the substrate surface. By way of example, the anodic layer may be around 20 micrometres in thickness, although other thicknesses may be useful, such as thicknesses in the range from about 10 micrometres to about 50 micrometres. The electrically insulating layer that is ultimately formed penetrates the pores of the porous surface layer, enabling good adhesion to be established between the applied electrically insulating layer and the porous surface layer on the substrate.

As noted above, the layer of porous oxide is pre-formed by an anodic oxidation process to a thickness of around 3-200 microns. The porous oxide layer is then coated with a first layer in the form of a layer of a polysiloxane sol-gel material by spraying.

Following spraying the formulation is allowed to dry in air at 20° C. for 1 hour to form a gel, before being fired at 150° C. in air for 1 hour to form a second layer, being a final layer.

It is believed that when the polysiloxane sol-gel material is applied to the substrate, polysiloxane particles migrate into the pores formed in the porous oxide layer. It is believed that this enables the formed electrically insulating layer to better adhere to the substrate, since it is able to better "key" into the pores provided over the substrate surface. The polysiloxane material as-fired is in many cases formed as a substantially continuous layer of electrically insulating material.

In more detail: a flow-chart of the overall process of fabricating a heat sink according to an embodiment of the present invention may be represented as follows.
START→S101: prepare sheet of aluminium for anodising→S103: anodise aluminium sheet→S105: dip-coat anodised sheet with polysiloxane solution to form a first layer→S107: dry and fire first layer to convert the first layer to a second layer→STOP In step S101, a substrate of aluminium in the form of a sheet is prepared for anodising. Preparation may include degreasing of the substrate. Light abrasion of the surface thereof may be performed in some embodiments. In step S103 the sheet is subjected to an anodic oxidation process to form a layer of porous native oxide thereover. In step S105 the sheet is spray-coated with a polysiloxane sol-gel solution to form a first layer of solution thereover. It is to be understood that other coating methods may also be employed in other embodiments, such as dip-coating or any other suitable technique. In step S107 the sheet is dried to convert the first layer into a polysiloxane gel layer. The gel layer is subsequently fired to convert the gel layer into a second layer in the form of a layer of electrically insulating material of relatively high scratch resistance that is highly thermally conducting and suitable for use as an electrically isolated heat exchange device according to embodiments of the present invention. During firing to convert the first layer into the second layer, the first layer is densified, and it is believed that chemical bonds are thus formed between particles of polysiloxane. Other process steps may occur in some example embodiments in addition to or instead of any one or more of the above steps, if appropriate or required.

In some embodiments, more than one layer of gel material may be formed before curing. Thus in some embodiments a layer of sol-gel material may be formed and dried to form a gel layer. A second layer of sol-gel material may then be formed over the gel layer, and again dried to form a second gel layer over the first layer. This process may be repeated as many times as required in order to form a gel coating of the required total thickness, although we have found that often a single coating may be sufficient for applications in which an electrical potential across the coating is expected to be up to 500V. Single coatings may also be suitable for higher potential differences, such as 1000V or more, in some embodiments. The gel coating may then be fired to form a layer of electrically insulating material of relatively high scratch resistance and which is highly thermally conducting, as described above.

In some embodiments, one or more regions of the substrate (i.e. the pre-formed body of the heat exchanger device 20) may be masked with a mask material such as a polymer material before the initial anodic oxidation process or before coating with the sol-gel material. The mask material may be removed before or after curing of the sol-gel material in order to prevent the formation of a tightly bonded, electrically insulating polysiloxane layer in the one or more regions. This process step may be useful where it is ultimately required to make an electrical connection directly to the substrate (i.e. the pre-formed body of the heat exchanger device 20), for example an earth connection.

As one specific practical Example of the above generally described process and its practical implementation, there may be mentioned the following sequence of processing and testing steps:

Example (1) A substrate—i.e. a pre-formed body of the heat exchanger device 20, displaying a generally flat or planar lower major face, whose lowermost sheet used to form it has a thickness of approximately 1 mm—was degreased and subjected to an anodic oxidation process. The anodic oxidation process was carried out according to BS EN ISO 7599—"Anodizing of aluminium and its alloys". This process resulted in the formation of a layer of aluminium oxide on the exposed lower surface of the body of approximately 30 microns in thickness.

(2) The substrate was then coated in a solution of a polysiloxane sol-gel material by a dip-coating process: The substrate was allowed to stand with its major face in a substantially vertical plane to "dry" the sol-gel material and convert the sol-gel layer into a gel layer. The substrate was then fired in order to cure the gel by heating to a temperature in the range from around 150° C. to around 300° C., optionally in the range from around 200° C. to around 250° C. in air. The substrate may be fired for any suitable period of time, for example a period of from about 10 minutes to about 100 minutes or more. Other temperatures and time periods may be useful in some other example processes. The firing process resulted in the formation of an electrically insulating layer on the lower surface of the body having a thickness of approximately 50 microns.

(3) Following fabrication of the electrical insulating layer on the body surface, electrical testing of the layer structure was performed to test the integrity of the insulating layer thus formed. An electrical contact was made to the underlying heat exchange body Al substrate by removal of a portion of the insulating layer, to form a first electrode. A second electrode was applied to the insulating layer spaced away from the first electrode and a potential difference established across the insulating layer between the Al substrate and the second electrode. A potential of 2 kV was applied and it was found that current flow through the insulating layer was negligible.

Whilst in many examples the material of the heat exchanger device body may comprise aluminium or an aluminium alloy, in other examples other suitable thermally conductive metals or metal alloys may be employed instead, if appropriate or desired, such as one or more metals or metal alloys selected from or containing any of the following: zinc, iron, a carbon steel, magnesium, titanium, niobium, zirconium, hafnium, tantalum, or an alloy of any of the foregoing metals, or possibly an alloy containing aluminium and any of lithium, beryllium or magnesium. Such alternative metals may also allow a native oxide to be readily formed thereover by anodic oxidation (e.g. in the case of a ferrous metal, a ferric oxide layer may be formed by exposure to red fuming nitric acid before depositing the sol-gel layer thereover), thereby usefully lending them well to a coating application/fabrication process as described above. Of course, however, other methods of forming an oxide on the substrate layer may be employed instead, if appropriate or desired.

Thus, by use of the above-described processing steps for applying or fabricating an electrically insulating coating layer on the relevant face or surface of the pre-formed heat exchanger body in accordance with embodiments of this invention, there may be produced a heat exchanger device 20 having a higher thermal conductivity than known heat sinks or heat exchangers, especially those already in use in battery applications, whilst providing excellent electrical insulation between the metallic substrate of the heat exchanger device body and electrically conductive components that it may be in contact with in a respective battery module 40*a*, 40*b*, 40*c* or overall battery pack or assembly 10 itself.

Furthermore, by use of this manufacturing technique it is possible to apply or fabricate a relatively highly scratch resistant, electrically insulating coating of relatively low thermal resistance on the substrate of the pre-formed heat exchanger device body, this being possible in a reliable, convenient, industrially applicable and cost effective manner. The relatively low thermal resistance of the coating may be made possible at least in part because a relatively thin, substantially continuous coating may be provided having good electrical insulation properties.

Figure 4:
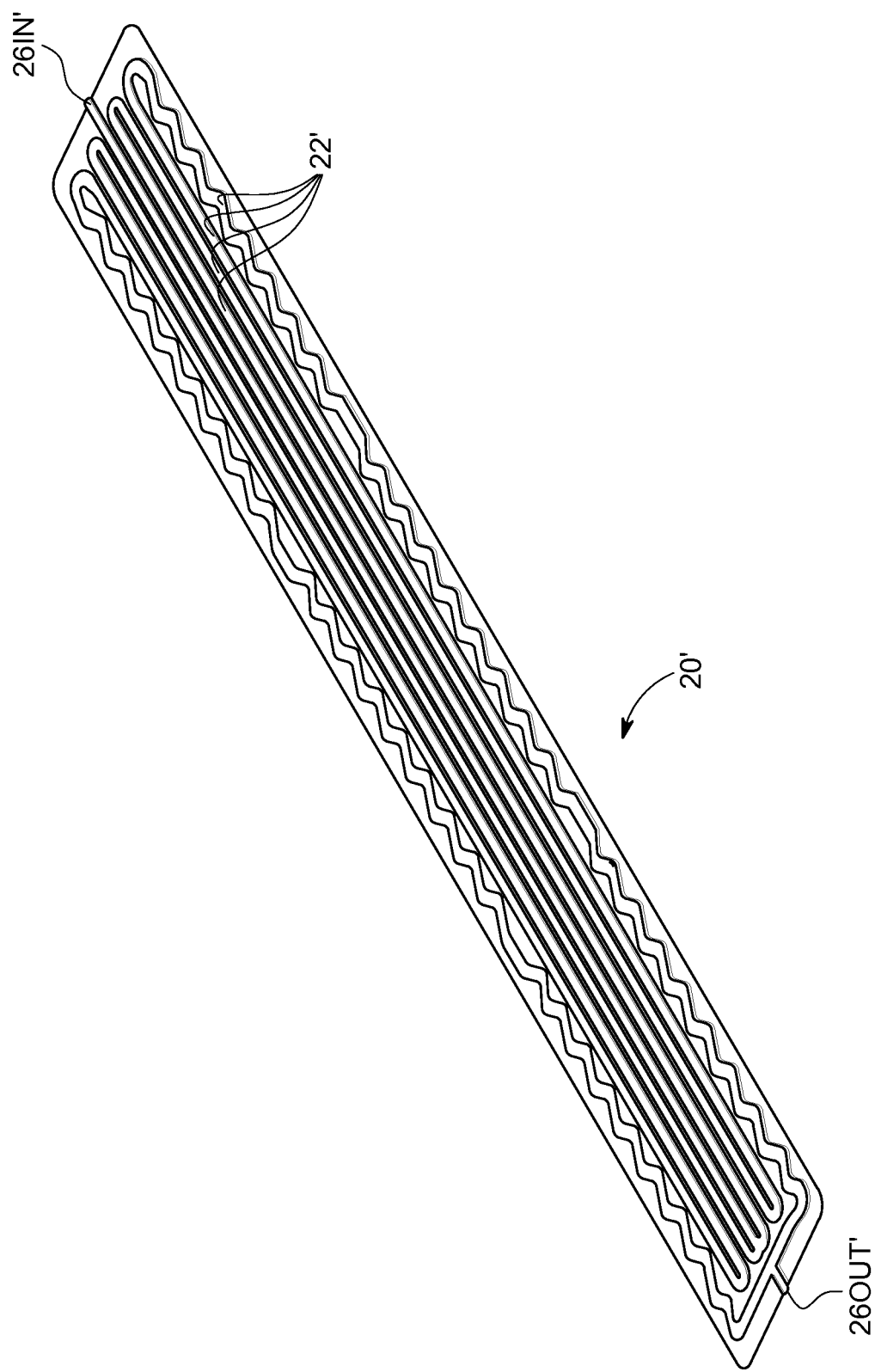
FIG. 4 is a top perspective view of an alternative embodiment heat exchanger usable in the assembly of FIG. 1, showing an alternative example arrangement of its thermal fluid flow channels.

FIG. 4 shows an alternative heat exchanger device 20' very similar to that of FIGS. 2 and 3(*a*) and 3(*b*), except that here the arrangement or pattern of the internal conduits or channels 22' is modified in shape, e.g. in order to provide a better tailored distribution and positional presence of heat transfer fluid as it travels through the device 20', e.g. as dictated by particular heat distributional requirements of a given battery module cell arrangement.

Figure 5:
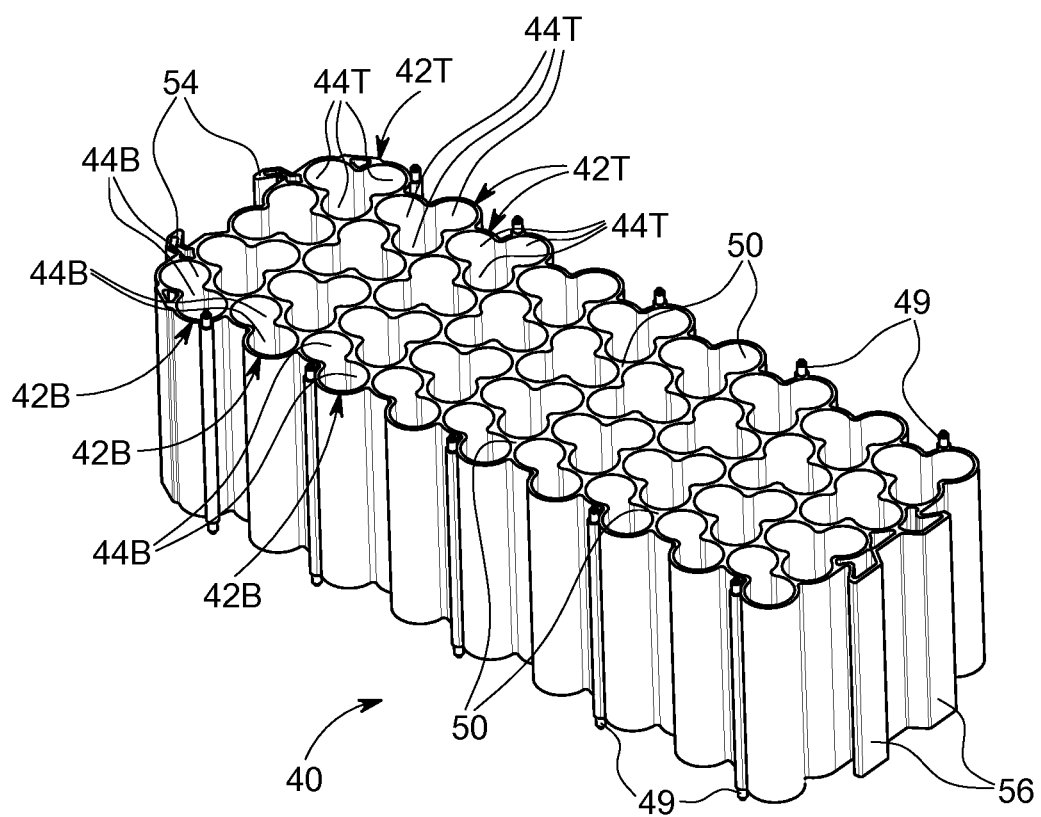
FIG. 5 is a top perspective view of the embodiment cell housing as shown in the assembly of FIG. 1.
Figure 6:
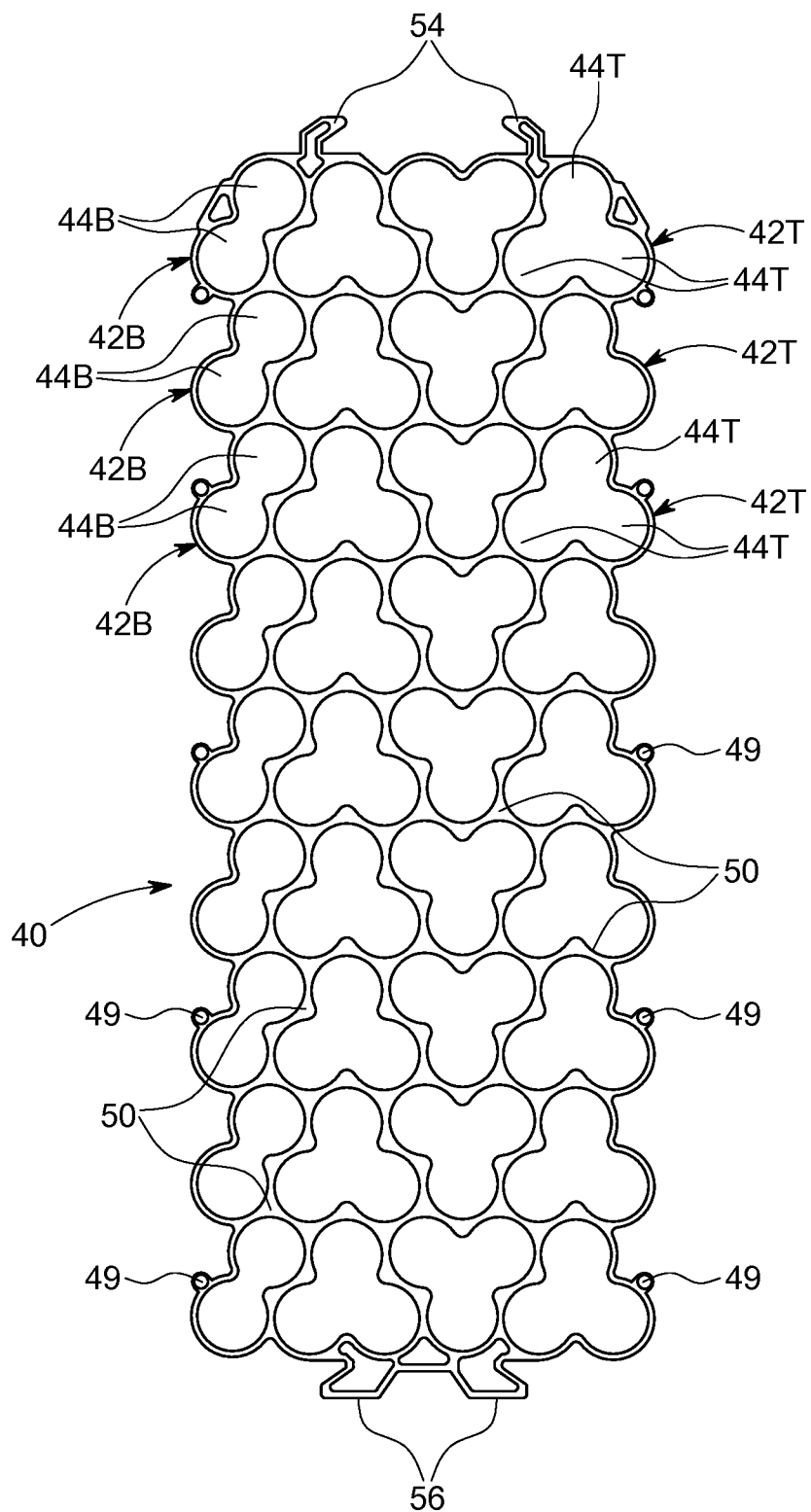
FIG. 6 is a top plan view of the cell housing of FIG. 5, showing more clearly the configuration and arrangement of its tri-lobed cell housing compartments.

Turning now to FIGS. 5 and 6, these show an embodiment of a cell housing 40 according to an embodiment of one or more of the cell housing aspects of the present invention. The illustrated cell housing 40 may corresponding to any of the individual cell housings 40*a*, 40*b*, 40*c* shown in FIG. 1.

The cell housing 40 is formed as a unitary moulded body comprising an array of the nature of a "honeycomb"-like structure comprising a collection of interconnected side-by-side compartments 44B, 44T, etc each for accommodating a single electrochemical battery cell (not shown, for clarity). The cells are collectively arranged for connection together in a parallel electrical arrangement, whereas the individual battery modules Ma, Mb, Mc are interconnected in a series arrangement. In the example embodiment shown each compartment 44B, 44T, etc is configured for accommodating a generally substantially cylindrical-walled electrochemical battery cell therewithin. For this purpose each compartment 44B, 44T, etc is of a sufficient height to fully accommodate the respective cell therein whilst allowing electrical connections to be made to its lower and upper poles or terminals (as described further below).

In some embodiment configurations, in particular in the case of battery cells which are slightly conical in the outer shape of their casings, each compartment 44B, 44T, etc may be formed with side walls whose configurations mirror or substantially geometrically match that conical shape, so that each cell is able to be accommodated stably and snugly within its respective compartment, especially for example so as to be retained therein under gravity or without any discrete retention element needed to hold each respective cell in place within its respective compartment.

The cell housing 40 is formed as a unitary discrete entity by any suitable conventional moulding technique, with its various curved or arcuate side walls 50 being interconnected in various configurations to form the various compartments 44B, 44T, etc therein. In addition to the compartments themselves, the cell housing 40 is formed with integral end-features 54, 56 for enabling adjacent housings, e.g. 40*a* and 40*b*, or 40*b* and 40*c*, to be physically interlocked or interconnected together in a longitudinal direction, as shown in FIG. 1. There may be further provided on the integral cell housing moulding 40 any suitable number of appropriately located or positioned locating pins, stakes, spigots, bosses or detents 49, which may be used to locate, mount and/or retain one or more other components of a given battery module, or battery pack or assembly, such as one or more heat exchanger devices 20 or one or more busbar connectors (such as retention features thereof labelled as 249 in FIG. 8) or even other components of the overall arrangement.

Once the battery module or battery pack has been fully assembled, such pins, stakes, spigots, bosses or detents 49 may if desired be deformed, e.g. using heat or ultrasonics, to form respective retention heads thereon which effectively secure the relevant heat exchanger 20 or other component(s) in its/their final mounted position(s) in the assembly.

The material from which the cell housing is formed by moulding is a thermally conductive, electrically insulating material and may be formed by any suitable known moulding method, examples of which are widely available and used in the art. The material comprises a matrix of an electrically insulating material, having dispersed or distributed therewithin particles of a thermally conductive material. The particles may be uniformly dispersed throughout the matrix material. They may be incorporated into the matrix material in any suitable mixing-in stage of the overall moulding process and the preparation of the component materials therefor.

By way of example the matrix may be a plastics material, such as a natural or synthetic polymeric material or resin, having a suitably high electrical resistivity. One suitable example of such electrical insulating plastics material is a GRP (glass-reinforced plastics), or the corresponding matrix plastics material from which known GRP materials are made. Suitable examples of electrically insulating GRP materials are widely available in the art of industrial plastics for various applications, and may comprise a matrix or binder of a variety of resins or polymers (e.g. epoxy, thermoplastic or thermosetting), for instance an isophthalic polyester resin, and may have distributed therein an array or network of glass fibres. As alternative materials to GRPs, there may instead be employed as the matric material various ceramic-reinforced plastics, examples of which are also well-known per se in the art.

The particles of thermally conductive material dispersed or distributed in the matrix may comprise particles of any suitable material having a suitably high thermal conductivity. Examples include various predominantly non-metallic materials, e.g. certain ceramic materials, or thermally conductive polymers. Some practical examples of suitable such materials include: bauxite, alumina (aluminium oxide), polyphenylene sulfide (PPS, such as that from Celanese Corporation).

The particles of the dispersed material within the matrix may be of any suitable size and shape, such as may be dictated by the thermal conductivity properties required of the resulting housing material. In some example forms the particles may for instance have an average (mean) particle width or diameter (as the case may be) in the approximate range of up to about 1 or 2 or 3 or 5 or 8 or 10 or 20 or 30 or 40 or 50 or 75 or 100 or 200 or 400 or 600 or 800 or 1000 microns (1 mm), or possibly even up to 1 or 2 or 3 or 5 mm. In some example forms the particles may for instance be irregularly or asymmetrically shaped particles, e.g. flakes, which is to say they comprise flattened bodies of the material, e.g. having one or more, optionally a pair of opposed, faces with at least one lateral dimension or a surface area which is significantly greater or significantly smaller than the corresponding dimension or surface area of one or more of its other faces. In other example forms, however, the particles may be substantially regularly or symmetrically shaped particles, e.g. generally approximately spherical or polyhedral.

The relative proportions of the electrically insulating matrix material and the material forming the dispersed thermally conductive particles may vary depending on the individual thermal properties required of the cell housing material once moulded into its final shape and spatial arrangement of compartments.

By way of example, however, the electrically insulating matrix material may for instance make up from about 50 or 60 or 70 or 80 or 89 or 90% by weight up to about 90 or 91 or 92 or 95 or 97 or 98 or 99% by weight of the housing material. Conversely, the thermally conductive material dispersed or distributed as particles in the matrix may for instance make up from about 1 or 2 or 3 or 5 or 8 or 9 or 10% by weight up to about 10 or 11 or 20 or 30 or 40 or 50% by weight of the housing material. However, precise relative proportions of the two principal components may be selected in any given practical scenario in accordance with principles and techniques well-known to the skilled person versed in the art of industrial moulding materials, in order to arrive at a housing material having optimum thermal conductivity properties to suit any specific battery module demands.

Generally the composition of the material of the cell housing may be selected so as to provide an optimum balance between its thermal conductivity and a required level of heat transfer through the material, also taking into account its electrical strength against a required level of electrical isolation between the cells and/or busbars within or surrounding the housing.

The individual compartments 44B, 44T, etc in the cell housing 40 are defined by respective arcuate side-walls thereof, which join or attach or connect any one compartment to any one other compartment by virtue of those side walls—such as those labelled 50 in FIGS. 5 and 6—being at least partially united together or fused or even in common, in particular as integrally formed portions of the overall unitary moulding which forms the complete housing 40.

The compartments 44B, 44T, etc are configured and arranged in discrete groups 42B, 42T, etc, with each group having the appearance (when viewed in plan, as seen in the FIGS.) of a plural-lobed moulding, each lobe of the moulding corresponding to a single compartment in which a battery cell is to be accommodated. Within each group the compartments 44B, 44T, etc may be arranged substantially symmetrically about a central axis, especially rotationally symmetrically about that central axis, when viewed in plan.

In this illustrated example the groups of compartments comprise three linear rows (spaced apart in the longitudinal direction of the housing 40) of equi-spaced three-lobed moulded compartments 44T, in the style of a "trefoil" or "cloverleaf" shape, and a single row (again spaced apart in the longitudinal direction of the housing 40) of equi-spaced two-lobed moulded compartments 44B, in the style of a "bifoil" shape.

Other numbers of rows of other configurations of groups of compartments, or any combination of discrete species of groups each comprising different numbers of compartment "lobes" per group may be employed in other example forms. In particular, specific patterns and arrangements of various species of lobed groups of compartments may be employed in various alternative example forms of cell housings still within the scope of the invention, especially in order to optimise space-filling or packing and in order to optimise the degree to which such arrangements may optimise the thicknesses, shapes and layouts of compartment side walls in such a way as to beneficially effect their overall heat transfer and distribution characteristics.

It will be noted that in the illustrated embodiment example, the groups 42T of tri-lobed compartments 44T in any one given longitudinal row are equi-spaced within but oriented in a rotationally different orientation—specifically a 120°—rotationally-shifted rotational orientation—relative to each other (when viewed in plan). Furthermore, the tri-lobed groups 42T of compartments 44T in the one given row protrude, e.g. a short distance (such as about 0.5 or 1 or 2 or 3 or 4 or 5 up to about 7 or 8 or 10 or 12 or 15 or 20 or 25 or 30 or 35 or 40 or 45 or 50% of the diameter or width of a single compartment 44T), into the gap or space between individual groups 42T in the immediately adjacent row. This close-packing arrangement may thus serve to reduce large variations in the wall thicknesses that divide and define individual compartments 44B, 44T, etc, thereby potentially reducing large variations in thermal conductivity—and thus overall thermal transfer properties—as between different locations or sites within the overall cell housing moulded structure.

Of course, in other example embodiment forms, other shapes of individual compartments, the shapes of the groups into which they are grouped, and relative spatial arrangements and distributions of those groups relative to each other, may be employed, as appropriate or desired.

In general, however, the cell compartments 44B, 44T, etc formed in the housing 40 may be shaped and grouped so as to provide optimisation between being able to provide sufficient energy density within a given material volume, e.g. dependent on the planar space restrictions within an overall battery module Ma, Mb, Mc, and being able to provide sufficient transfer of heat from, or to, or between cells whilst minimising the effects of any cell and housing moulding dimensional variations.

Figure 7:
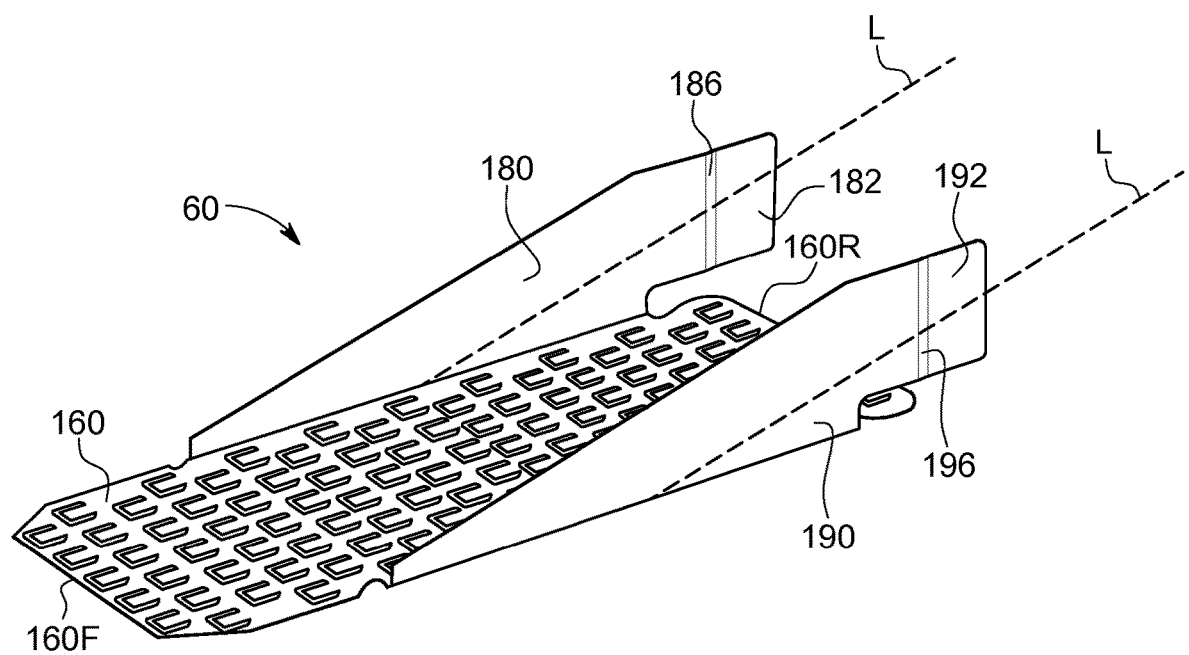
FIG. 7 is a top perspective view of the embodiment busbar connector as shown in the assembly of FIG. 1.
Figure 8:
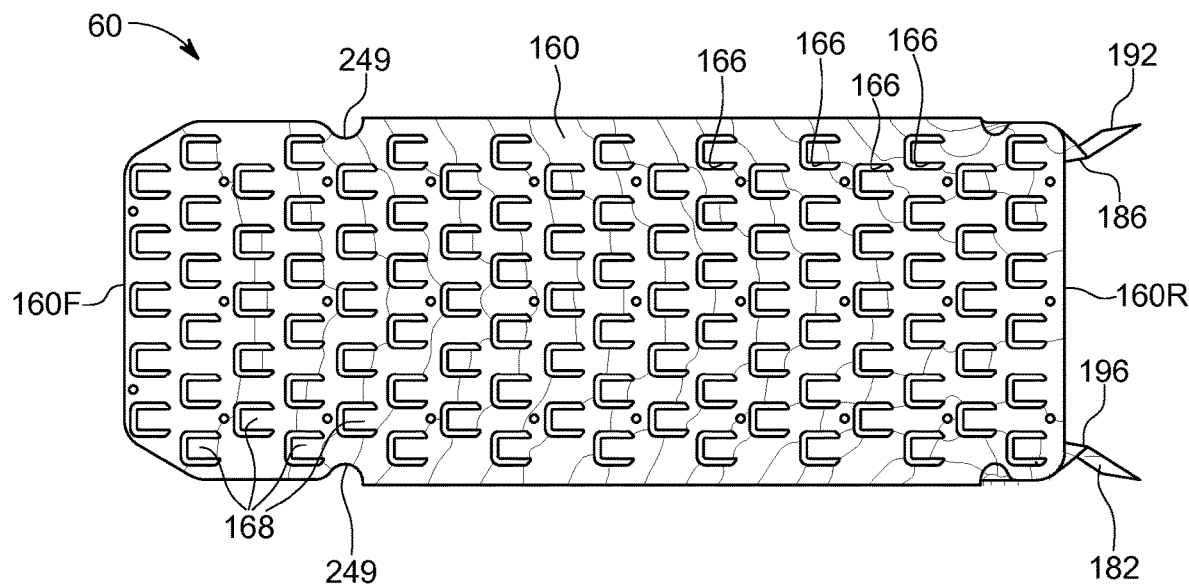
FIG. 8 is a bottom plan view of the busbar connector if FIG. 7.
Figure 9:
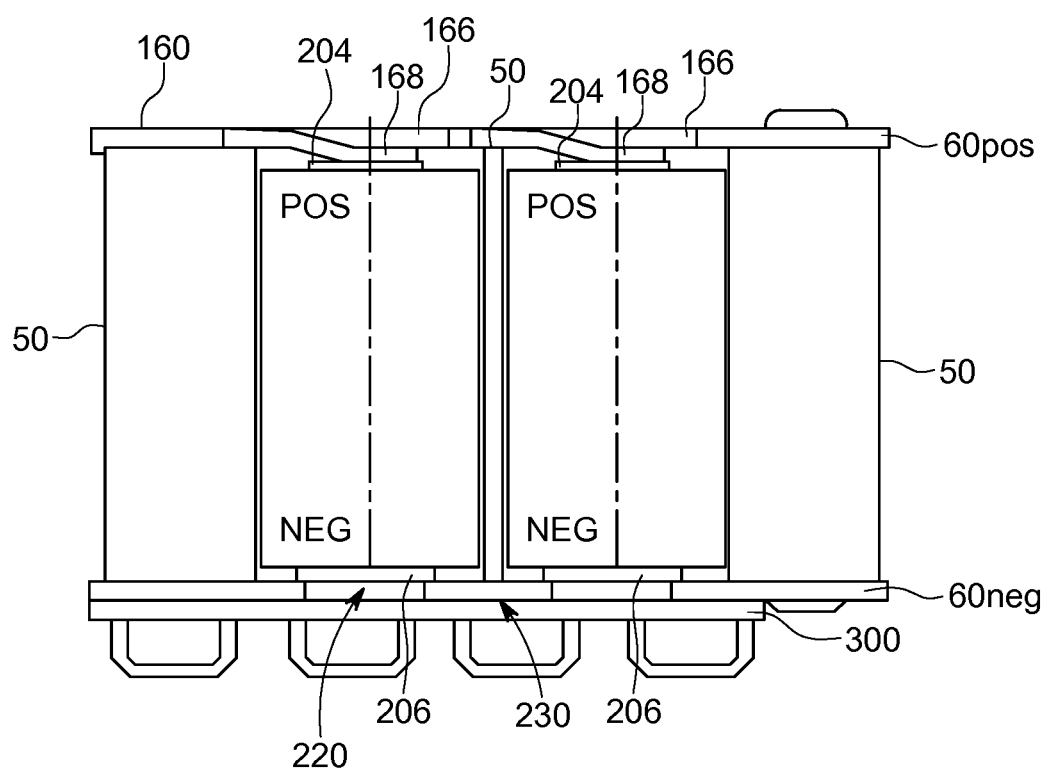
FIG. 9 is an explanatory cross-sectional view of the manner in which electrical connection is made between the busbar connector of FIG. 7 and cells in the battery module array.

Turning now to FIGS. 7, 8 and 9, these show an embodiment of a busbar connector 60 according to an embodiment of one or more of the busbar connector aspects of the present invention. The illustrated busbar connector 60 may be any of the individual busbar connectors 60aA, 60aB; 60bA, 60bB; 60cA, 60cB; shown in FIG. 1.

The busbar connector 60 comprises a base portion 160, and, extending at an approximate right-angle)(−90° from opposite lateral sides of the base portion 160, a pair of opposed parallel connector portions 180, 190. Each of the base portion 160 and connector portions 180, 190 is formed from an electrically conductive material, e.g. copper, a copper alloy or any other suitable material having an appropriately high electrical conductivity. The base portion 160 is generally approximately flat or planar in shape, and each connector portion 180, 190 is also substantially flat or planar. Conveniently the busbar connector 160 may be formed, e.g. by bending, folding or otherwise shaping by any suitable means, from a unitary blank, e.g. in sheet form, of the material pre-formed, e.g. by pre-moulding, pre-cutting, pre-stamping or otherwise pre-machining, into the required shape and configuration to form the respective base portion 160 and connector portions 180, 190 of the finished busbar connector 60.

The base portion 160 is configured so as to be placeable against or in abutment with or adjacent an upper or a lower face of a respective cell housing 40, where connections are made to the respective cells accommodated within the housing 40. The pair of connector portions 180, 190 are configured so as to be placeable so as to bear against or abut respective ones of a pair of opposite lateral side faces of the respective cell housing 40. This relative arrangement can be seen more clearly in FIG. 1.

Each of the respective connector portions 180, 190 of the busbar connector 60 is specially shaped, when viewed side-on, so as to have a non-uniform transverse cross-sectional area passing therealong. Alternatively this feature may be defined as the respective connector position 180, 190 having a lateral width which varies passing along it. Thus, it may be considered that the side-on shape of each respective connector portion 180, 190 is generally substantially triangular or tapered passing towards its end distal from the base portion. Thus, a major side of the triangle opposite its hypotenuse may form a site or line of connection or attachment or joining, especially an integral such connection/attachment/joining, of the respective connector portion 180, 190 to the base portion 160.

According to an alternative definition of the respective connector portions 180, 190, the base portion 160 and each respective connector portion 180, 190 are united or joined via a respective attachment portion, and each respective attachment portion may be defined as having a length dimension, in the same direction as the longitudinal length of the base portion 160, which is greater than the lateral width of the respective connector portion 180, 190 at locations therealong spaced or distal from the respective attachment portion.

According to yet another alternative definition of the respective connector portions 180, 190, each said connector portion 180, 190 may alternatively be defined as extending transversely from a lateral side of the base portion 160, and further extending in a general length direction L thereof (as shown in FIG. 7) which lies at an angle relative to the longitudinal length direction of the base portion 160, wherein the said angle lies in the approximate range of from greater than about 0 or 2 or 5 or 10 or 15 or 20 or 25° up to about 30 or 40 or 50 or 60 or 70 or 80 or 90° relative to the longitudinal length direction of the base portion 160.

Any of the above defined shapes and/or configurations of the respective connector portions 180, 190 of the busbar connector 60 may further be such that the respective connector portions 180, 190 of different, discrete, busbar connectors 60 on the respective lateral sides of a given cell housing 40 bear against or abut different respective regions of the same lateral side, wherein said regions are separated from each other by a distance sufficient to electrically insulate the two connector portions 180, 190 from each other on that lateral side of the cell housing.

As shown by way of example in FIGS. 8 and 9, the base portion 160 of the or each busbar connector 60 (of which the positive polarity busbar connector is designated "60pos", and the negative polarity busbar connector is designated "60neg") is apertured or foraminate, such that it comprises an array of a plurality of apertures 166 therein. The apertures 166 are generally part-rectangular in shape (when viewed in plan), although they may alternatively be arcuate or even part-circular. The apertures 166 are arranged in an array, wherein each aperture corresponds to and is positioned or located in the locality of a corresponding location of a respective pole or terminal 204, 206 of a battery cell 200 to be accommodated in a respective compartment 44B, 44t, etc in a cell housing 40 when the busbar connector 60 is fitted to or mounted on a respective cell array of a respective battery module M.

Within each respective aperture 166 the material of the base portion 160 is formed into a tongue or protrusion or extension 168 which protrudes or extends into the respective aperture 166 from a peripheral side thereof, e.g. a side proximal a rear end 160R of the base portion 160. Each respective tongue or protrusion or extension 168 is configured so as to lie out of, especially below, a general plane of the base portion 160.

Furthermore, the electrically conductive material forming the or each tongue or protrusion or extension 168 has a reduced thickness, e.g. of the order of 0.3 mm, which is less than the thickness of the material of the base portion 160 which surrounds the respective aperture 166, which may typically be around 1.5 mm. This reduced thickness of ~0.3 mm of the or each tongue or protrusion or extension 168 may typically be approximately equal to a thickness of a material forming a cell pole or terminal 204 (FIG. 9) itself, or a material forming a casing wall of a cell, which is to be electrically connected to the respective tongue or protrusion or extension 168 by a process involving welding. This feature may serve to assist in making an efficient and secure welded connection between the respective tongue or protrusion or extension 168 and a respective cell pole or terminal.

FIG. 9 also shows by way of example the manner in which a heat exchanger device 300 is mounted in the overall arrangement of the battery module, with its electrical insulating coating 230 applied thereto and a thermal paste optionally included in any gaps between the heat exchanger device 300 and the relevant poles or terminals 206 of the battery cells 200.

As mentioned above, and as illustrated in the embodiment busbar connector 60 shown in FIG. 7, each connector portion 180, 190 may be thought of as extending transversely from a lateral side of the base portion 160, and further extending in a general length direction L thereof which lies at an angle relative to the longitudinal length direction of the base portion 160, wherein the said angle lies in the approximate range of from greater than about 0 or 2 or 5 or 10 or 15 or 20 or 25° up to about 30 or 40 or 50 or 60 or 70 or 80 or 90° relative to the longitudinal length direction of the base portion 160. In this manner each connector portion 180, 190 may thus be configured with a "swept-back" or "swept-forward" configuration (depending on whether the general length direction in which the respective connector portion is considered, or is defined, as extending is towards a rear end 160R or a forward end 160F of the respective base portion 160 of the respective busbar connector 60).

In some embodiment forms the above-mentioned respective directions towards the aforementioned rear end 160R or forward end 160F, as the case may be, in which the connector portions 180, 190 are considered, or are defined, as extending, may each independently be or correspond to a longitudinal direction of the base portion 160 in which, when in use, a voltage gradient or a current density increases—or, in alternative embodiments, decreases— passing longitudinally along the base portion 160 of the busbar connector 60. This "swept-back" or "swept-forward" configuration of the or the respective connector portion may in such instances assist in the "equilibration" or "evening out" of variations in current densities and distributions across or through specific portions of the busbar connector 60, thereby leading to improved or at least more reliable contributions of the busbar connector 60 to overall heat distributions—especially equilibrated heat distributions— within a given battery module M, especially across the cells thereof, and/or between modules Ma, Mb, Mc in an assembled battery pack 10.

However, in other embodiment forms other spatial or configurational relationships between the direction, and/or angle relative to the general plane of the base portion, and/or shape of the or each connector portion, relative to a voltage gradient and/or current density increase or decrease passing along the base portion of the busbar connector in the said longitudinal direction thereof, may be possible.

The pair of connector portions 180, 190 of the busbar connector 60 are configured so as to be generally geometrically substantially identical to one another, but a mirror image of one another.

Each connector portion 180, 190 terminates in a respective electrical interconnection end portion 182, 192 distal from the base portion 160, wherein each terminal interconnection end portion 182, 192 extends in a direction parallel to the longitudinal direction of the base portion 160. Each terminal interconnection end portion 182, 192 extends a distance, e.g. typically a short distance, such as up to about 1 or 2 or 5 or 8 or 10 or 12 or 15 or 20% of the longitudinal length of the base portion 160, beyond the longitudinal limit of the base portion 160, whereby the or each respective terminal interconnection end portion 182, 192 is configured to be electrically interconnectable to another, like terminal interconnection end portion 182, 192 of another, like connector portion 180, 190 of another, like busbar connector 60 provided on an adjacent or sequentially next battery module M in a series of battery modules Ma, Mb, Mc in an overall battery pack or assembly 10. In this manner adjacent or sequentially next battery modules Ma, Mb, Mc in a battery pack or assembly 10 can be conveniently electrically connected together via the respective busbar connectors 180, 190 in each module Ma, Mb, Mc, in order to fulfil the overall electrical supply parameters of the battery pack or assembly 10.

In order to facilitate the making of such electrical interconnections between adjacent or sequentially next interconnection end portions 182, 192 of respective connector portions 180, 190 of respective busbar connectors 60 in adjacent or sequentially next modules Ma, Mb, Mc, the respective interconnection end portions 182, 192 may each be connected to its respective connector portion 180, 190 by a respective step or ramp 186, 196, whereby a stepped or ramped interconnection end portion 182, 192 on one busbar connector's connector portion 180, 190 may be more readily placed into side-by-side electrically conductive abutment with, e.g. by virtue of being welded or adhered to, a correspondingly, but oppositely, stepped or ramped interconnection end portion 182, 192 on the other busbar connector's connector portion 180, 190.

As shown in the illustrated embodiment arrangement of FIGS. 1 and 7, each battery module Ma, Mb, Mc is fitted with a pair of busbar connectors 60aA, 60aB; 60bA, 60bB; 60cA, 60c, respectively. In each module the two busbar connectors form a pair, which are geometrically identical or similar to each other but are configured as mirror images of each other. Thus, a base portion 160 of a first one of the busbar connectors 60 is mounted on, e.g. in abutment against, an upper major face of the module M, and a base portion 160 of a second one of the busbar connectors 60 is mounted on, e.g. in abutment against, a lower, opposite major face of that module M. The upper major face of the module M is an upper major face of a cell housing 40 of the module M that accommodates the battery cells of that module, and the lower major face of the module M is a lower major face of the cell housing 40, whereby each of the respective base portions 160 of the two busbar connectors 60 is in abutting electrical contact with the poles or terminals of the cells accommodated in the housing 40 of the module M on the respective upper and lower major faces thereof.

Also as shown in the illustrated embodiment arrangement, the configurations of the respective connector portions 180, 190 of the respective busbar connectors 60 of the pair in each module M are such that the respective connector portions 180, 190 on each respective lateral side of the cell housing 40 bear against or abut different respective regions of the same lateral side of the cell housing 40, wherein said regions are separated from each other by a distance sufficient to electrically insulate the two connector portions 180, 190 from each other on that lateral side of the cell housing 40 or module M. In some embodiment forms this relative configuration may be conveniently achieved and exploited, especially in terms of the ease with which adjacent modules Ma, Mb, Mc may be electrically interconnected via their respective busbar connectors 60, by virtue of the two geometrically similar or identical (albeit mirror image) busbar connectors 60 being oriented in a reversed longitudinal orientation relative to each other on the two opposite major faces of the cell housing 40 or module M.

As a result of our investigations, we have found that by designing a busbar connector to have certain novel features of shape and configuration as defined and described above, it is possible to control or adjust or tailor current densities and current distributions at particular points and/or positions and/or regions therewithin, which may be exploited to good effect in further optimising heat transfers and heat distributions within a battery module, and in particular between individual cells and across cell arrays in such a module.

In some cases such improved control of current densities and current distributions may lead to advantageous effects of "equilibration" or "evening out" of variations in current densities and distributions, i.e. the reduction of "hot-spots", across or through specific portions of the busbar, thereby leading to improved or at least more reliable contributions of the busbar to overall heat distributions—especially equilibrated heat distributions—within a given battery module, especially across the cells thereof, and/or between modules in an assembled battery pack.

It is to be understood that the above description of one or more specific embodiments of the invention has been by way of non-limiting examples only, and various modifications may be made from what has been specifically described and illustrated whilst remaining within the scope of the invention as defined by the appended claims.

Throughout the description and claims of this specification, the words "comprise" and "contain" and linguistic variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A busbar connector for making one or more electrical connections within or to a battery module of a battery pack, the battery module comprising one or more battery cells, wherein the busbar connector comprises:
   a base portion for forming an electrical connection to one or more of the battery cells within the battery module; and
   a pair of connector portions for forming an electrical connection from the base portion to one or more other components of the battery module of the battery pack, each one of said pair of connector portions extending away from a respective side of the base portion, whereby the pair of connector portions are arranged or configured to bear against or abut respective ones of a pair of opposite side faces of a cell housing, wherein the base portion is arranged to lie against or in abutment or adjacent an upper or a lower face of the cell housing such that the base portion makes electrical connections to the one or more of the battery cells accommodated within the housing;
   wherein at least one of the following (i) to (iv) is satisfied:
   (i) the pair of connector portions has a non-uniform transverse cross-sectional area passing therealong,
   (ii) the pair of connector portions has a lateral width which varies passing therealong,
   (iii) the base portion has a longitudinal length, the base portion and the pair of connector portions are united or joined via an attachment portion, and the attachment portion has a longitudinal length dimension, in the same direction as the longitudinal length of the base portion, which is greater than the lateral width of the pair of connector portions at locations therealong spaced or distal from the attachment portion, and
   (iv) the base portion has a longitudinal length, and the pair of connector portions extends transversely from a lateral side of the base portion, and further extends in a general length direction thereof which lies at an angle relative to the longitudinal length direction of the base portion, wherein the angle lies in the range of from greater than 0° up to 90° relative to the longitudinal length direction of the base portion.

2. A busbar connector according to claim 1, wherein (iii) is satisfied and the longitudinal length dimension of the attachment portion corresponds to at least a majority portion of the longitudinal length of the base portion, such that the longitudinal length dimension of the attachment portion is greater than 50% of the longitudinal length of the base portion.

3. A busbar connector according to claim 2, wherein the attachment portion is or comprises a fold or an angled portion, wherein the angle of the fold or angled portion is approximately a right angle.

4. A busbar connector according to claim 1, wherein the base portion and the pair of connector portions are configured relative to each other such that they are placeable against different but adjacent sides or faces of the cell housing.

5. A busbar connector according to claim 1, wherein the pair of connector portions are oriented substantially parallel to each other.

6. A busbar connector according to claim 1, wherein the pair of connector portions are configured so as to be generally geometrically substantially identical to one another and a mirror image of one another.

7. A busbar connector according to claim 1, wherein either or both of the connector portions is joined or united to or with the base portion at an angle relative thereto, wherein the angle is approximately 90°.

8. A busbar connector according to claim 1, wherein either or both of the connector portions is generally tapered when viewed side-on, and narrowing in its lateral width dimension passing from its site or line of connection or attachment or joining to the base portion towards an end thereof distal from the base portion, optionally wherein that site or line of connection or attachment or joining is an integral connection or uniting of the material of the respective connector and base portions.

9. A busbar connector according to claim 1, wherein the base portion is apertured or foraminate, whereby it comprises or contain a plurality of apertures therein, optionally wherein the apertures are arranged in an array, wherein each aperture corresponds to and is positioned or located in the vicinity or locality of or adjacent to a corresponding location of a respective pole or terminal of a cell to be accommodated in a respective compartment in a cell housing when the busbar connector is fitted to or mounted on a respective cell array of a respective battery module.

10. A busbar connector according to claim 1, wherein (iv) is satisfied, and either or both of the respective connector portions is configured with a swept-back or swept-forward configuration, depending on whether the general length direction in which the connector portion is considered, or is defined, as extending towards a rear end or a forward end of the base portion of the busbar connector.

11. A busbar connector according to claim 10, wherein the general length direction towards the rear end or the general length direction towards the forward end, in which the respective connector portions are considered, or are defined, as extending, each independently are or correspond to a longitudinal direction of the base portion in which, when in use, a voltage gradient or a current density increases passing longitudinally along the base portion of the busbar connector, or wherein the respective general length directions towards the rear end or the forward end, in which the respective connector portions are considered, or are defined, as extending, each independently are or correspond to a longitudinal direction of the base portion in which, when in use, a voltage gradient or a current density decreases passing longitudinally along the base portion of the busbar connector.

12. A busbar connector according to claim 1, wherein either or both of the connector portions terminates in an electrical interconnection end portion distal from the base portion.

13. A busbar connector according to claim 12, wherein either or both of the terminal interconnection end portions extends a distance of up to 20% of the longitudinal length of the base portion beyond the longitudinal limit of the base portion, whereby either or both of the respective terminal interconnection end portions is configured to be electrically interconnectable to another, like terminal interconnection end portion of another, like connector portion of another, like busbar connector provided on an adjacent or sequentially next battery module in a series of battery modules in an overall battery pack or assembly.

14. A busbar connector according to claim 12, wherein the respective interconnection end portions are each connected to their respective connector portions by a step or ramp, whereby a stepped or ramped interconnection end portion on one busbar connector's connector portion can be placed into side-by-side electrically conductive abutment with a correspondingly but oppositely stepped or ramped interconnection end portion on the other busbar connector's connector portion.

15. A method of making a busbar connector, comprising:
providing a blank of electrically conductive material having a first portion corresponding to and for forming the base portion as defined in claim 1, and
two second portions corresponding to and for forming the pair of connector portions as defined in claim 1; and
forming the blank, optionally by folding or bending or shaping, into said busbar connector according to claim 1.

16. A battery module comprising at least one busbar connector according to claim 1.

17. A battery module comprising a pair of busbar connectors each according to claim 1, wherein the pair of busbar connectors are mounted or fitted thereon or thereto.

18. A battery comprising a battery module according to claim 16.

19. A vehicle including a battery according to claim 18.

20. A battery module according to claim 17, wherein each one of said pair of connector portions of the respective busbar connectors of the pair in each module are configured such that the respective connector portions on each respective lateral side of the cell housing bear against or abut different respective regions of the same lateral side of the cell housing, wherein said regions are separated from each other by a distance sufficient to electrically insulate said respective connector portions from each other on that lateral side of the cell housing or module.

* * * * *